US012140808B2

(12) United States Patent
Shah

(10) Patent No.: US 12,140,808 B2
(45) Date of Patent: Nov. 12, 2024

(54) ELECTRICAL CABLE CONNECTOR AND BOARD CONNECTOR

(71) Applicant: SAMTEC, INC., New Albany, IN (US)

(72) Inventor: Jignesh H. Shah, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 0 days.

(21) Appl. No.: 17/777,857

(22) PCT Filed: Nov. 18, 2020

(86) PCT No.: PCT/US2020/060993
§ 371 (c)(1),
(2) Date: May 18, 2022

(87) PCT Pub. No.: WO2021/101953
PCT Pub. Date: May 27, 2021

(65) Prior Publication Data
US 2022/0404570 A1 Dec. 22, 2022

Related U.S. Application Data

(60) Provisional application No. 62/994,194, filed on Mar. 24, 2020, provisional application No. 62/937,035, filed on Nov. 18, 2019.

(51) Int. Cl.
*H04B 10/00* (2013.01)
*G02B 6/42* (2006.01)
*H01R 12/75* (2011.01)

(52) U.S. Cl.
CPC ........... *G02B 6/4284* (2013.01); *H01R 12/75* (2013.01)

(58) Field of Classification Search
CPC .. G02B 6/4284; G02B 6/4214; G02B 6/4249; G02B 6/428; H01R 12/75
See application file for complete search history.

(56) References Cited

U.S. PATENT DOCUMENTS

| | | | | |
|---|---|---|---|---|
| 6,974,262 B1 * | 12/2005 | Rickenbach | ......... | G02B 6/3817 385/88 |
| 7,186,144 B1 * | 3/2007 | Khemakhem | ........ | H01R 31/065 439/76.1 |
| 7,458,855 B2 * | 12/2008 | Khemakhem | ........ | H01R 31/065 439/76.1 |
| 7,527,527 B2 | 5/2009 | Morlion et al. | | |
| 7,841,776 B2 * | 11/2010 | DiFonzo | .................. | G06F 1/26 385/74 |

(Continued)

FOREIGN PATENT DOCUMENTS

TW 200540483 A 12/2005
WO 2012035428 A1 3/2012

OTHER PUBLICATIONS

Molex, "Quad Small Form-factor Pluggable Plus (QSFP+) Interconnect Solution," 2011, 14 pages.

*Primary Examiner* — Agustin Bello
(74) *Attorney, Agent, or Firm* — BakerHostetler

(57) ABSTRACT

An electrical communication system includes a plurality of cable connectors that are configured to mate with the same electrical connector or electrical connectors having substantially identical mating interfaces. The cable connectors can be configured as an electrical cable connector, an optical cable connector, and a hybrid cable connector that includes both optical and electrical communication.

26 Claims, 12 Drawing Sheets

(56) References Cited

U.S. PATENT DOCUMENTS

| | | | |
|---|---|---|---|
| 8,124,496 B2* | 2/2012 | Su | H01R 13/7175 |
| | | | 438/449 |
| 8,262,410 B2 | 9/2012 | Campbell et al. | |
| 8,974,126 B2* | 3/2015 | Sloey | G02B 6/4204 |
| | | | 385/93 |
| 9,063,300 B2* | 6/2015 | Torikai | G02B 6/3807 |
| 9,091,822 B2* | 7/2015 | DeMerritt | G02B 6/381 |
| 9,097,862 B2* | 8/2015 | Tanaka | G02B 6/4293 |
| 9,134,489 B2* | 9/2015 | Zbinden | G02B 6/4249 |
| 9,374,165 B2 | 6/2016 | Zbinden et al. | |
| 9,500,815 B2* | 11/2016 | Good | G02B 6/3882 |
| 9,599,772 B2* | 3/2017 | Qi | G02B 6/32 |
| 9,791,634 B2* | 10/2017 | DiFonzo | G02B 6/3817 |
| 10,025,042 B2* | 7/2018 | Isenhour | G02B 6/3849 |
| 10,113,739 B2* | 10/2018 | Schneider, II | F21V 23/0457 |
| 10,185,094 B2* | 1/2019 | Isenhour | G02B 6/3817 |
| 10,247,893 B1* | 4/2019 | Elkayam | H02J 1/10 |
| 10,277,329 B2* | 4/2019 | Sipes, Jr. | G02B 6/4292 |
| 10,277,330 B2* | 4/2019 | Sipes, Jr. | H04L 12/6418 |
| 10,396,494 B2* | 8/2019 | Little | H01R 12/7023 |
| 10,756,824 B2* | 8/2020 | Sundaram | G02B 6/4246 |
| 10,768,375 B2* | 9/2020 | Leigh | G02B 6/3882 |
| 10,796,824 B2* | 10/2020 | Kim | H01B 7/04 |
| 11,025,345 B2* | 6/2021 | Sipes, Jr. | H04N 23/65 |
| 11,201,422 B2* | 12/2021 | Lu | H01R 13/6658 |
| 11,372,182 B2* | 6/2022 | Godfraind | A61N 1/086 |
| 11,388,374 B2* | 7/2022 | Tong | H04N 21/4183 |
| 11,573,376 B2* | 2/2023 | Wang | G02B 6/32 |
| 2002/0006748 A1* | 1/2002 | Tolmie | H01R 43/18 |
| | | | 439/607.06 |
| 2002/0076995 A1 | 6/2002 | Kurimoto et al. | |
| 2005/0276547 A1 | 12/2005 | Wang et al. | |
| 2006/0088251 A1* | 4/2006 | Wang | G02B 6/4201 |
| | | | 385/101 |
| 2007/0237464 A1 | 10/2007 | Aronson et al. | |
| 2008/0013895 A1* | 1/2008 | Daikuhara | G02B 6/4201 |
| | | | 385/88 |
| 2011/0123157 A1 | 5/2011 | Belsan et al. | |
| 2011/0229078 A1* | 9/2011 | Isenhour | G02B 6/3817 |
| | | | 385/33 |
| 2011/0229090 A1* | 9/2011 | Isenhour | G02B 6/4246 |
| | | | 385/78 |
| 2012/0020629 A1* | 1/2012 | Shiratori | G02B 6/322 |
| | | | 385/92 |
| 2012/0148198 A1 | 6/2012 | Togami et al. | |
| 2012/0195556 A1* | 8/2012 | Wang | G02B 6/3866 |
| | | | 29/857 |
| 2013/0087690 A1* | 4/2013 | Sloey | G02B 6/262 |
| | | | 250/216 |
| 2013/0089290 A1* | 4/2013 | Sloey | G02B 6/4204 |
| | | | 385/74 |
| 2014/0029899 A1* | 1/2014 | Isenhour | G02B 6/3885 |
| | | | 385/79 |
| 2014/0193122 A1 | 7/2014 | Wu et al. | |
| 2014/0193160 A1* | 7/2014 | Yagisawa | G02B 6/4246 |
| | | | 398/136 |
| 2015/0110444 A1* | 4/2015 | Tanaka | G02B 6/3817 |
| | | | 385/75 |
| 2015/0309271 A1* | 10/2015 | Huegerich | G02B 6/4284 |
| | | | 385/101 |
| 2016/0020911 A1* | 1/2016 | Sipes, Jr. | H04B 10/40 |
| | | | 398/16 |
| 2016/0077287 A1* | 3/2016 | Isenhour | G02B 6/4293 |
| | | | 385/76 |
| 2017/0285271 A1* | 10/2017 | Sipes, Jr. | G02B 6/4292 |
| 2019/0146169 A1* | 5/2019 | Grandidge | H04B 3/02 |
| | | | 375/257 |
| 2019/0181593 A1* | 6/2019 | Little | H01R 13/6593 |
| 2019/0304630 A1* | 10/2019 | Goergen | H01B 9/003 |
| 2021/0392300 A1* | 12/2021 | Tong | G02B 6/4292 |
| 2021/0392301 A1* | 12/2021 | Tong | H04N 21/615 |
| 2022/0404570 A1* | 12/2022 | Shah | G02B 6/4284 |

* cited by examiner

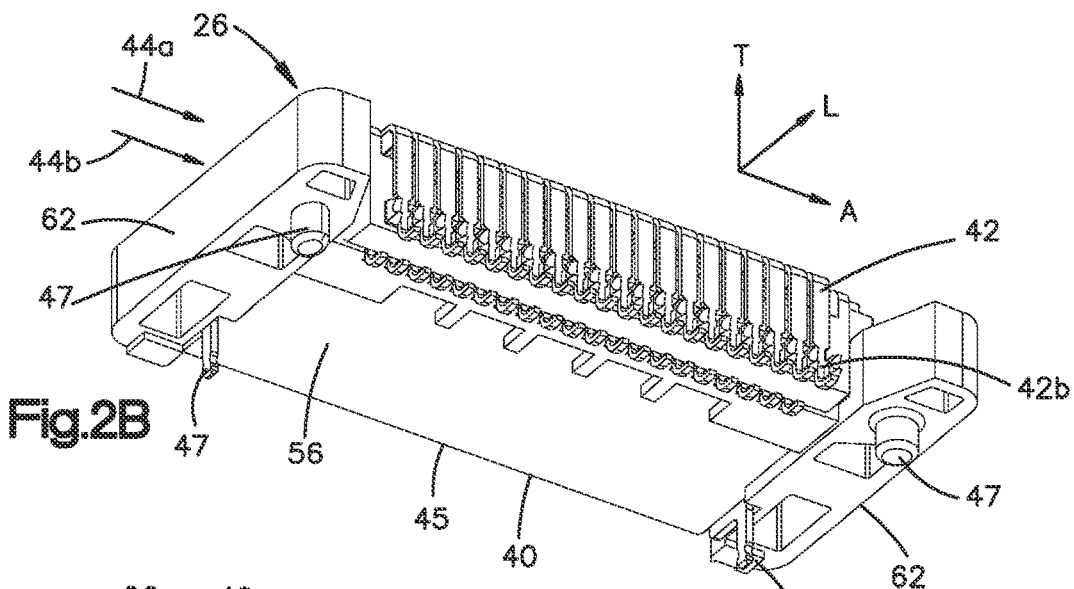
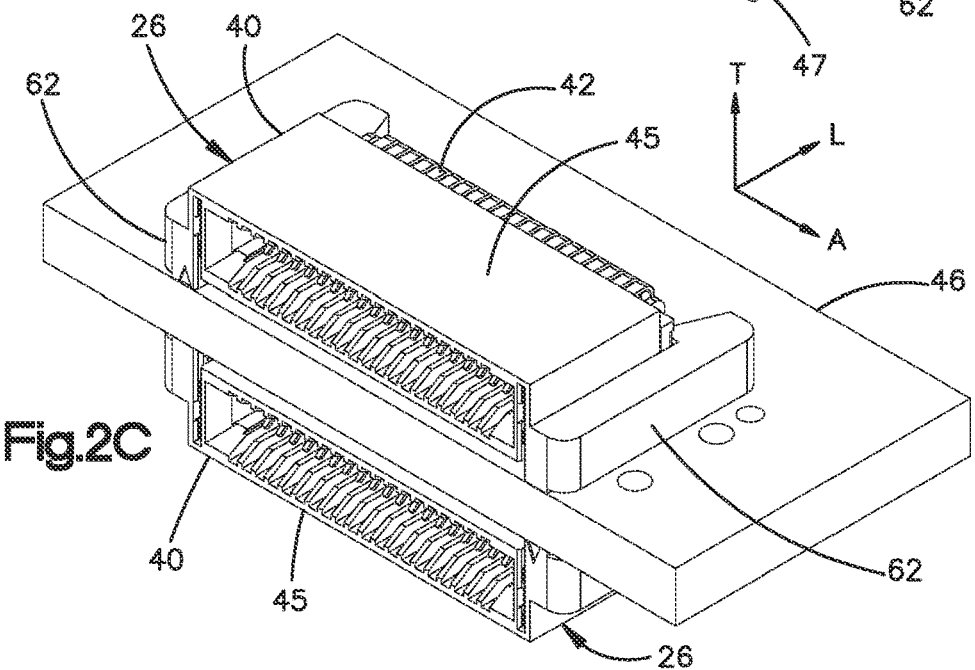
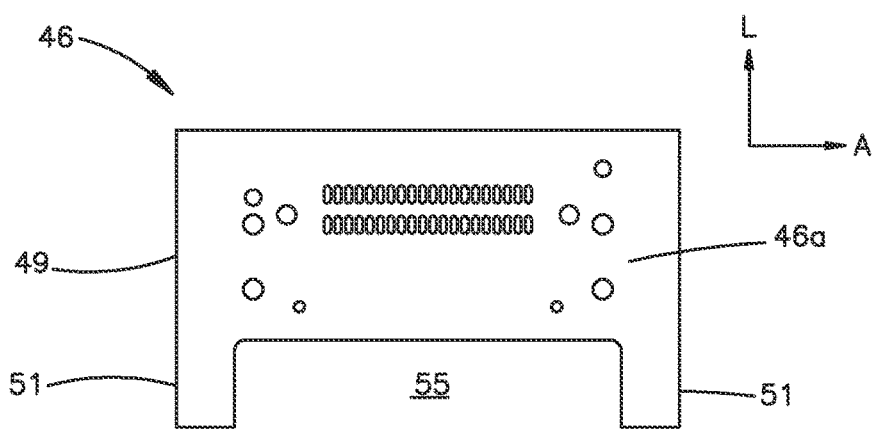

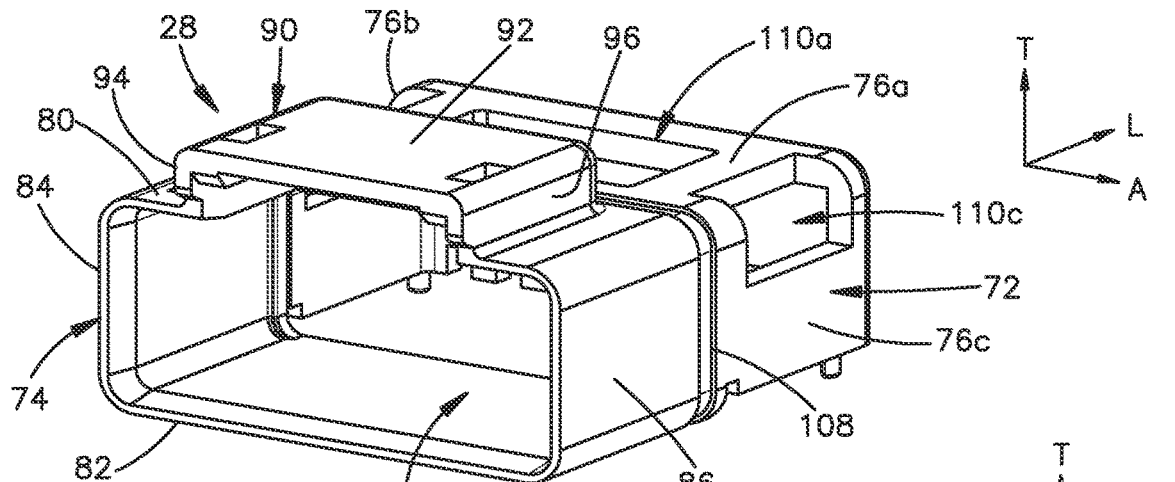
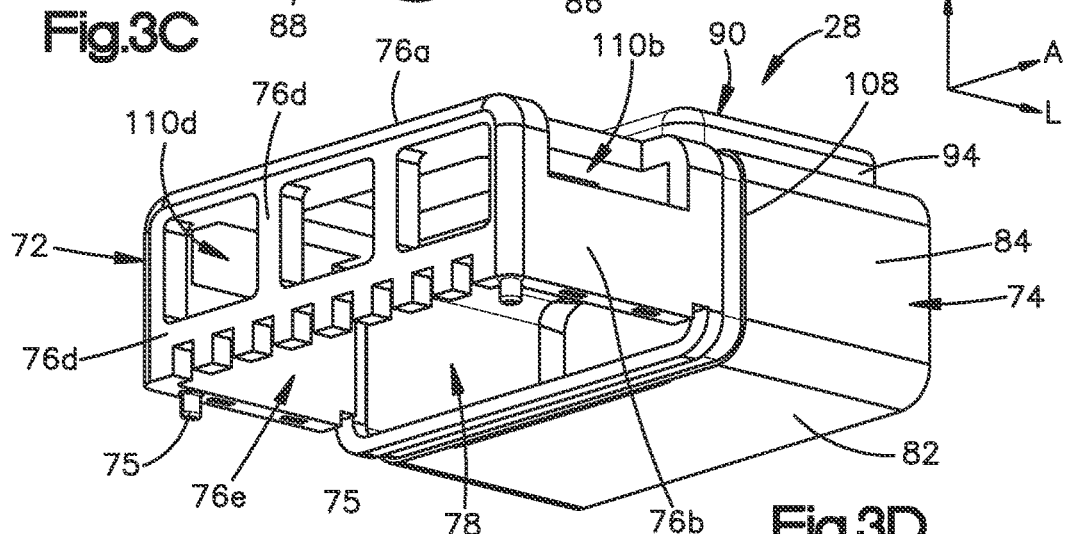
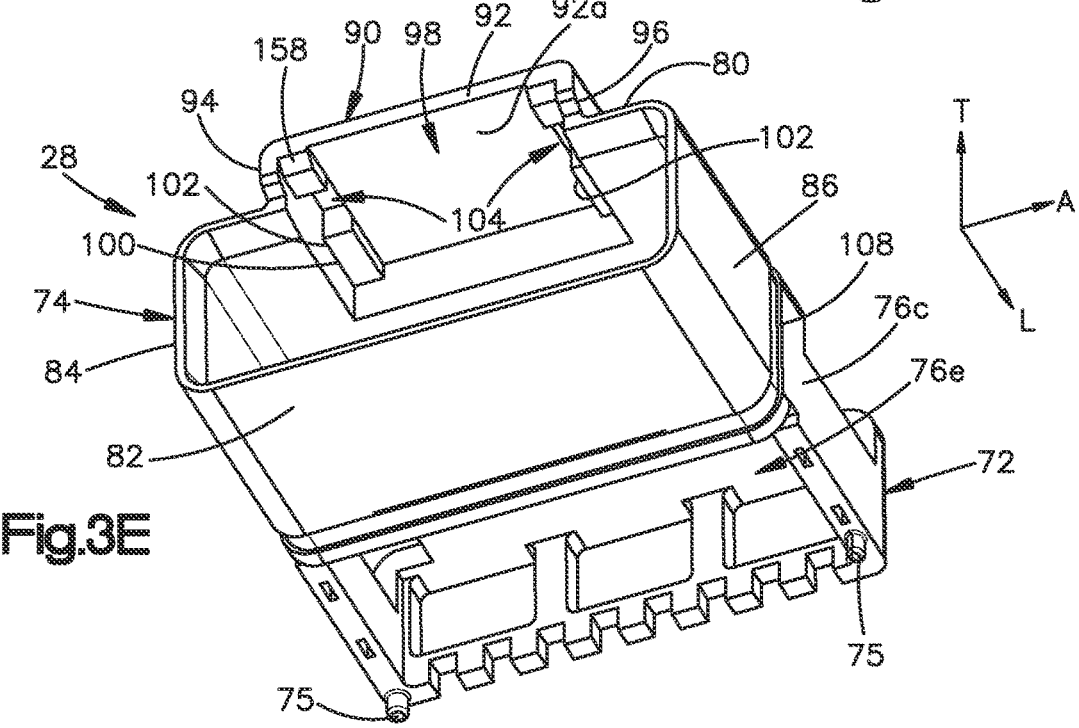

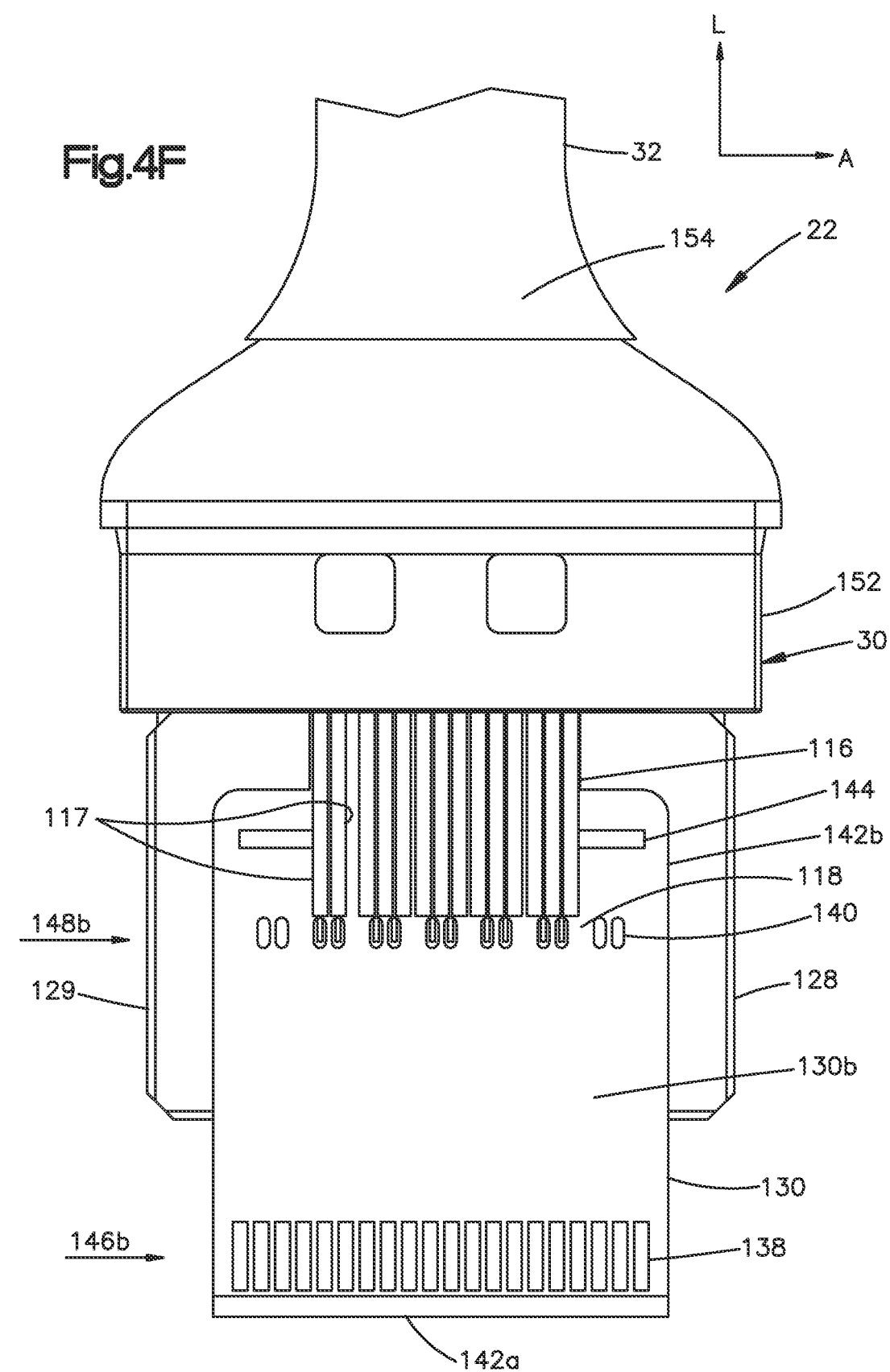

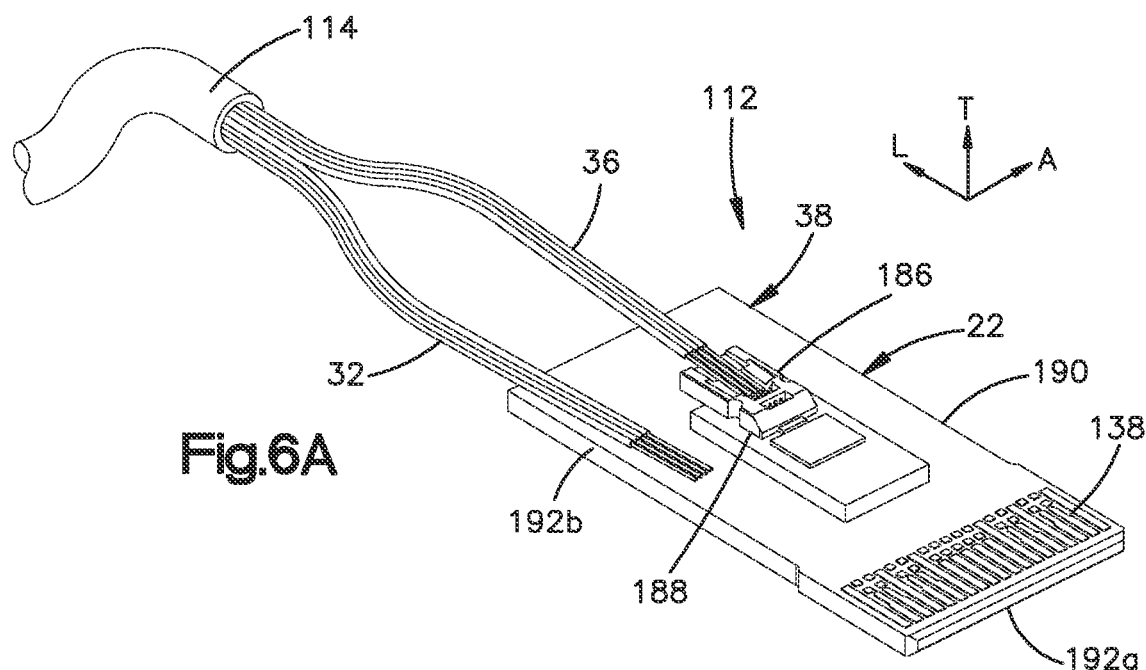
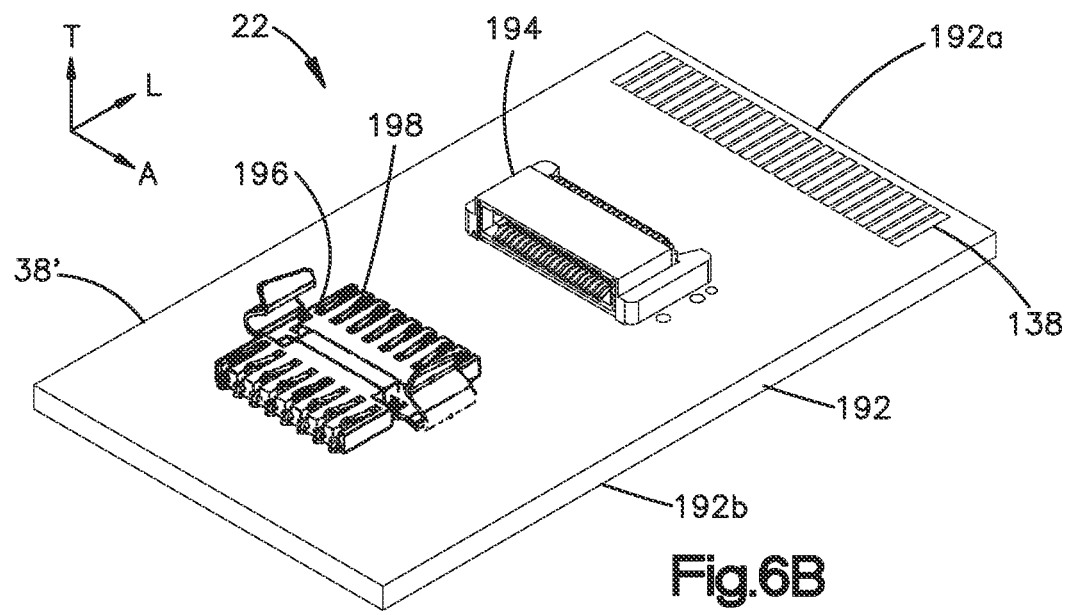

ELECTRICAL CABLE CONNECTOR AND BOARD CONNECTOR

CROSS-REFERENCE TO RELATED APPLICATIONS

This application is the National Stage Application of International Patent Application No. PCT/US2020/060993 filed Nov. 18, 2020, which claims priority to U.S. Patent Application Ser. No. 62/937,035 filed Nov. 18, 2019 and U.S. Patent Application Ser. No. 62/994,194 filed Mar. 24, 2020, the disclosure of each of which is hereby incorporated by reference as if set forth in its entirety herein.

BACKGROUND

Automobiles are being outfitted with increasingly complex electrical technology. Accordingly, automobiles are equipped with data communication systems that place components such as controllers, sensors, and controlled devices in electrical communication with each other. Electrical connectors are mounted to respective electrical components, and mated with each other at separable interfaces to place the electrical components in electrical communication with each other.

One such electrical connector, known as the Fachkreis Automobil (FAKRA) connector, is an automotive-grade electrical connector that is capable of withstanding mechanical shock and vibration forces associated with normal operation of the automobile. The FAKRA connector is cable of communicating electrical signals up to 6 GHz. While the FAKRA connector suitably mechanically robust and operates for its intended purpose of transferring data, the continuing evolution of automobile technology into spaces such as Light Detection and Ranging (Lidar) is placing a demand on data communication systems to not only be mechanical robust, but also be capable of transferring data at higher speeds than is conventionally available. Another electrical connector is the TE Connectivity REC DIELECTRIC RF STRIPLINE connector, an alternative to the FAKRA connector, which has published USCAR specification compliance through 5 GHz.

Further, automobiles are commercially available in a wide variety of sizes from subcompact cars up to full size sport utility vehicles (SUVs). As a result, the electrical components placed in electrical communication with each other are can be spaced at varying distances from each other in the automobile. For instance, the electrical components in a subcompact car may be in close enough proximity that signal degradation is significantly less than that in a SUV where the electrical components are spaced much further from each other.

What is therefore needed is an automotive data communication system that operates at high data transfer speeds while maintaining suitable signal integrity for the reliable operation of the electrical components.

SUMMARY

In one example, a kit of cable connectors each having mating interfaces are selectively intermateable with a mating interface of a common electrical connector. The kit can include an electrical cable connector having a respective electrically insulative cable connector housing, a respective substrate supported by the cable connector housing, and a plurality of electrically conductive cables mounted to the substrate, wherein the substrate includes electrical contact pads that are configured to mate with the common electrical connector. The kit can further include an optical cable connector having a respective electrically insulative cable connector housing, a transceiver substrate supported by the cable connector housing of the optical cable connector, an optical engine mounted to transceiver substrate, and a plurality of optical fibers mounted to the optical engine, wherein the transceiver substrate includes electrical contact pads that are configured to mate with the common electrical connector.

BRIEF DESCRIPTION OF THE DRAWINGS

The foregoing summary, as well as the following detailed description of illustrative embodiments of the present application, will be better understood when read in conjunction with the appended drawings. For the purposes of illustrating the locking structures of the present application, there is shown in the drawings illustrative embodiments. It should be understood, however, that the application is not limited to the precise arrangements and instrumentalities shown. In the drawings:

FIG. 2B is another perspective view of the electrical board connector of FIG. 1;

FIG. 2C is a perspective view of a pair of the electrical board connectors of FIG. 1 mounted to a printed circuit board;

FIG. 2D is a top plan view of the printed circuit board of FIG. 2C in accordance with one embodiment;

FIG. 3C is a perspective view of the cage of FIG. 3A;

FIG. 3D is another perspective view of the cage of FIG. 3A;

FIG. 3E is another perspective view of the cage of FIG. 3A;

FIG. 4F is a bottom plan view of the electrical cable connector of FIG. 4C, shown mounted to the data communication cable configured as a plurality of electrical cables;

FIG. 6A is a perspective view of a cable connector configured as a hybrid cable connector shown mounted to the data communication cable configured as a plurality of optical cables and a plurality of electrical cables;

FIG. 6B is a perspective view of a portion of a hybrid cable connector constructed in accordance with an alternative embodiment;

DETAILED DESCRIPTION

Figure 1:
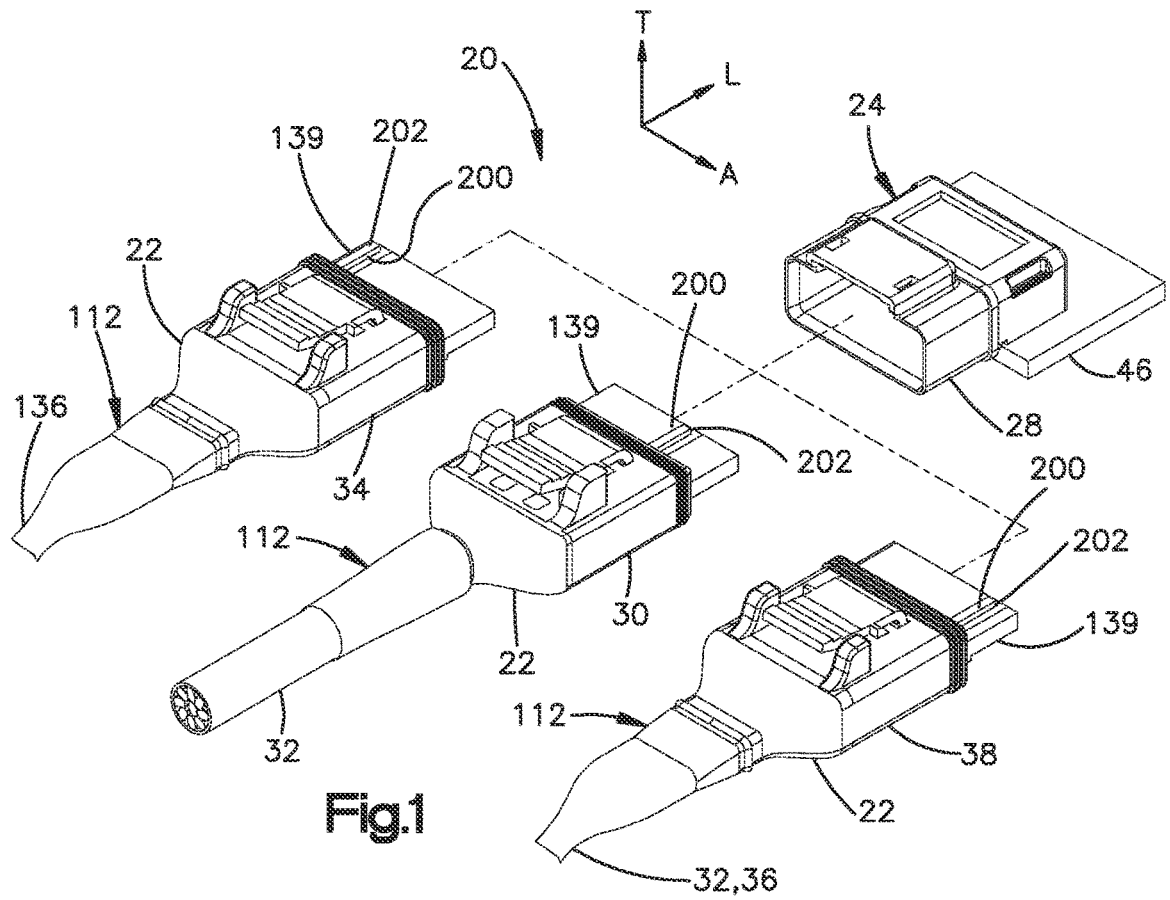
FIG. 1 is a perspective view of a data communication system including an electrical board connector and a plurality of cable connectors configured to be individually and selectively mated with the board connector, the cable connectors including an electrical cable connector, an optical cable connector, and a hybrid cable connector.

Referring to FIG. 1, a data communication system 20 can include at least one of a cable connector 22 and an electrical board connector assembly 24. The board connector assembly 24 includes an electrical board connector 26 (see FIG. 2) and a cage 28 that at least partially surrounds the board connector 26. The cable connector 22 is mateable with the board connector assembly 24. The cable connector 22 is configured to be mounted to a data communication cable 114 so as to place the cable 114 in data communication with a substrate of the cable connector 22, and thus with the board connector 26 when the cable connector 22 is mated with the board connector. The cable connector 22 can be configured as an electrical cable connector 30 such that the cables 114 are configured as electrical cables 32, an optical cable connector 34 whereby the cables 114 are configured as optical cables or fibers 36, or a hybrid cable connector 38 whereby the cables include both electrical cables 32 and optical cables 36. At least two or more up to all of the electrical cable connector 30, the optical cable connector 34, and the hybrid cable connector 38 are configured to independently and selectively mate with the board connector assembly 24. Thus, at least two or more up to all of the electrical cable connector 30, the optical cable connector 34, and the hybrid cable connector 38 define substantially identical mating interfaces. That is, the mating interfaces of at least two or more up to all of the electrical cable connector 30, the optical cable connector 34, and the hybrid cable connector 38 can mate with the electrical board connector 26 through the cage 28. At least portion of the board connector assembly 24 and the cable connector 22 are configured to be disposed in an electronic control unit (ECU) of an automobile. Thus, the data communication system 20 can be referred to as automotive grade, and configured to withstand forces associated with acceleration, deceleration, and vibration during normal use of the automobile. For instance, the electrical board connector assembly 24 can be disposed in one of a trunk, a passenger cabin, or a front dashboard panel of an automobile.

As will be appreciated from the description below, the data communication system 20, and thus the cable connector 22 and the board connector 26, can be compliant with multiple performance standards suitable for use in an automobile that undergoes acceleration and deceleration and vibration during normal use. For instance, the data communication system 20 can be compliant with the X4 PCIe Generation 4 Standard. The data communication system 20 can also be compliant with the X4 PCIe Generation 5 Standard. The data communication system 20 can be compliant with the USB Type C Standard. The data communication system 20 can be compliant with the United States Council for Automotive Research (USCAR) 2 Standard. For instance, the data communication system 20 can be compliant with the ingress protection (IP) standard outlined in USCAR2. For instance, the data communication system 20 can be compliant with IP 54 as pertains to dust and liquid splash, respectively. Further, the data communication system 20 can be compliant with IP 65 as pertains to dust and liquid splash, respectively. The data communication system 20 can be compliant with the mechanical shock and vibration requirements of the USCAR-2, 5.4.6 standard. The data communication system 20 can be compliant with the VW80000 Standard. The data communication system 20 can be compliant with the ISO 16750 Standard. Further, the data communication system 20 can be ethernet 10G compliant. Further still, the data communication system 20 can be ethernet 25G compliant. Additionally, the data communication system 20 can be compliant with the electrical requirements of USB Type-C Cable and Connector Specification Revision 2.0 dated Oct. 15, 2020. Additionally still, data communication system 20 can be compliant with the IEEE 802.3ch standard.

Figure 2A:
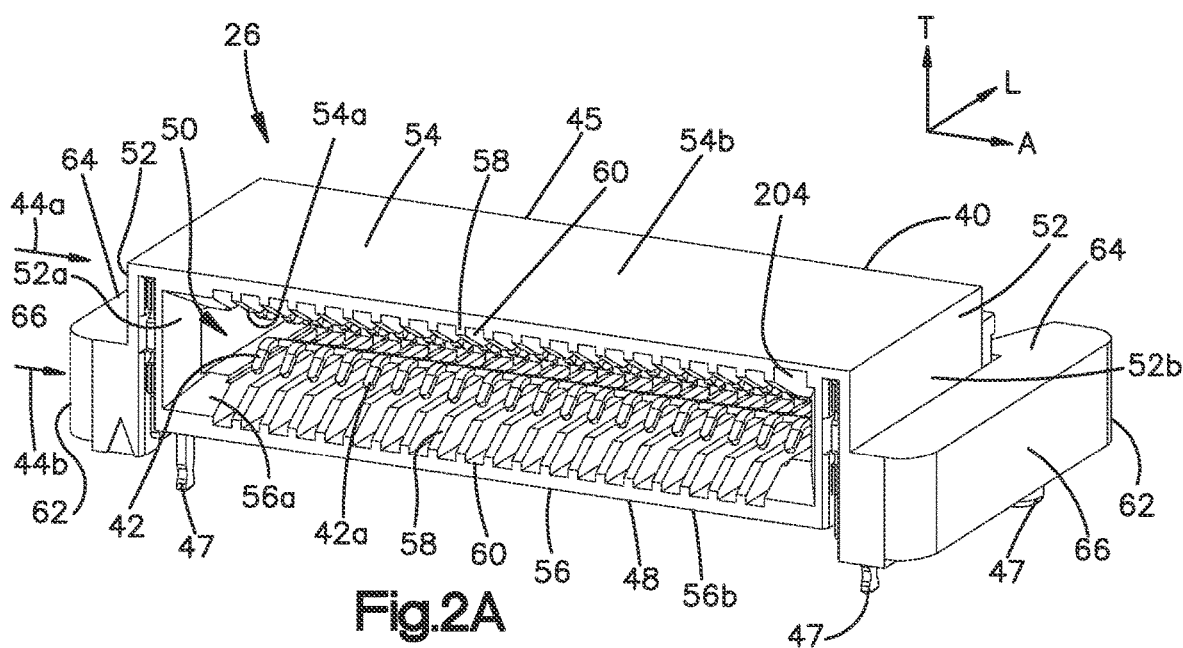
FIG. 2A is a perspective view of the electrical board connector of FIG. 1.

With specific reference now to FIGS. 2A-2C, the electrical board connector 26 is configured to mate with the cable connector 22 along a forward or mating direction that is oriented along a longitudinal direction L, and is configured to unmate from the cable connector 22 along a rearward or unmating direction that is opposite the mating direction and oriented along the longitudinal direction L. The electrical board connector 26 can be configured as a HSEC8 electrical connector commercially available by Samtec Inc., having a principal place of business in New Albany, IN.

The electrical board connector 26 includes an electrically insulative board connector housing 40 and the at least one electrical board contact 42, such as plurality of electrical board contacts 42, that are supported by the board connector housing 40. The electrical board contacts 42 can be spaced from each other along a lateral direction A so as to define a respective at least one row. The lateral direction A is oriented substantially perpendicular to the longitudinal direction A. In one example, the electrical board contacts 42 can be arranged in first and second rows 44a and 44b. As is described in more detail below, the electrical contacts 42 of the first and second rows 44a and 44b are configured to be placed in electrical contact with electrical contact pads on opposed surfaces of a printed circuit board of a complementary one of the cable connectors 22.

The electrical board contacts 42 of one or both of the rows 44a and 44b can include a plurality of electrical transmit contacts that are configured to transmit electrical transmit signals to the cable connector 22, and a plurality of electrical receive contacts that are configured to receive electrical receive signals from the cable connector 22. In one example, the electrical board contacts 42 of the first row 44a can include electrical transmit contacts and no electrical receive contacts, and the electrical board contacts 42 of the second row 44b can include electrical receive contacts and no electrical transmit contacts. It is appreciated that this arrangement can be reversed such that the electrical board contacts 42 of the first row 44a can include electrical receive contacts and no electrical transmit contacts, and the electrical board contacts 42 of the second row 44b can include electrical transmit contacts and no electrical receive contacts. Some of the electrical contacts of each of the first and second rows 44a and 44b can be unassigned.

The electrical board contacts 42 of each row can include at least four signal contacts. The at least four signal contacts can be arranged as at least two differential signal pairs. In one example, the electrical board contacts 42 of each row can include at least eight signal contacts that can be arranged as four differential signal pairs, each differential signal pair being separated by a ground contact along the respective row, thereby defining a repeated S-S-G arrangement along the row wherein "S" represents an electrical signal contact and "G" represents an electrical ground contact. Other patterns are envisioned, such as S-S-G-G. The electrical board contacts 42 of each row can further include a clock contact and customizable low-speed sideband electrical contacts as desired.

The electrical board contacts 42 can define respective mating portions 42a configured to mate with respective electrical contacts of the cable connector 22, as described in more detail below. The electrical board contacts 42 can define respective mounting portions 42b configured to mount to a complementary electrical component that places the electrical board contacts 42 in electrical communication with the complementary electrical component. The complementary electrical component can be configured as a substrate 46 such as a printed circuit board. The electrical board connector 26 can further include one or more hold-down members 47 that are supported by the board connector housing 40 and are configured to be secured to the underlying substrate 46. In one example, one or more of the hold-down members 47 can be soldered to the underlying substrate 46 at respective solder joints, press-fit into apertures of the substrate 46, or otherwise attached to the substrate 46 as desired.

Figure 3A:
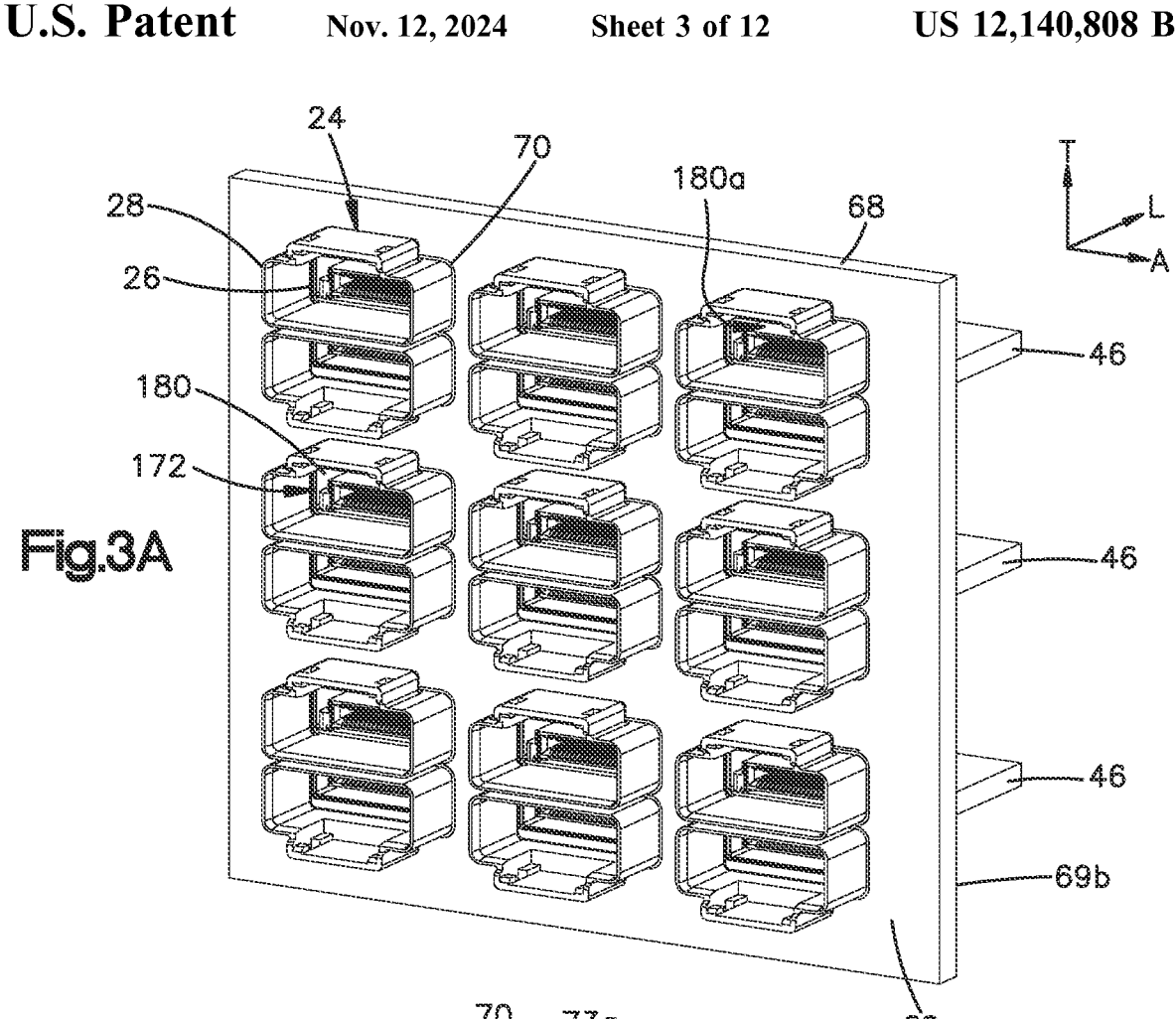
FIG. 3A is a perspective view of a plurality of electrical board connector assemblies each including the electrical connector of FIG. 2C and a cage that at least partially surrounds the electrical connector, showing the board assemblies supported by a panel.

Referring to FIG. 3A in particular, the board connector assemblies 24, including the board connectors 26 and the cages 22, can be mounted to opposite sides of the substrate 46. Each of the board connectors 26 can be configured to mate with a respective one of the cable connectors 22 as described herein. The substrate 46 can include a major first or top surface 46a and a major second or bottom surface 46b opposite the first or top surface 46a along the transverse direction T. The first and second surfaces 46a and 46b can be oriented along respective planes that extends along the longitudinal direction L and the lateral direction A. In one example, a first at least one electrical board assembly 24a such as a plurality of electrical board assemblies 24a can be mounted to the first surface 46a. A second at least one electrical board assembly 24b such as a plurality of electrical board assemblies 24b can be mounted to the second surface 46b. As described herein, each of the electrical board assemblies 24 can include a board connector and a cage 28 that at least surrounds at least a portion of the board connector 26. Further, pairs of first and second electrical board assemblies 24a and 24b mounted to the first and second surfaces 46a and 46b and aligned with each other along the transverse direction T can define pairs of electrical board assemblies whose bottom ends face each other along the transverse direction T.

Referring again to FIGS. 2A-2C, in one example the board connector 26 can be configured as a right-angle electrical connector. Thus, the electrical board contacts 42 can be configured as right-angle contacts that define a 90 degree bend at a location between the mating portions 42a and the mounting portions 42b. Thus, the mating portions 42a of the first and second rows 44a and 44b can be spaced from each other along a transverse direction T that is oriented substantially perpendicular to each of the longitudinal direction L and the lateral direction A. For instance, the mating portions 42a of the first row 44a can define a top row 44a of mating portions, and the mating portions 42a of the second row 44b can define a bottom row 44b of mating portions 42a. The mounting portions 42b of the first and second rows 44a and 44b can be spaced from each other along the longitudinal direction L. Alternatively, the electrical board contacts 42 can be configured as vertical contacts whose mating portions 42a and mounting portions 42b are inline with each other along the longitudinal direction L.

The board connector 26 can define any suitable structural size and shape as desired. In one example, the board connector housing 40 can include a housing body 45. Thus, description of the housing body 45 applies to both the board connector housing 40 and the board connector 26. In one example, the housing body 45 can include first and second side walls 52 that are opposite each other along the lateral direction A. The side walls 52 can be oriented generally along the transverse direction T and the longitudinal direction L. The housing body 45 can further include a top wall 54 and a bottom wall 56 opposite the top wall 54 along the transverse direction. The top and bottom walls 54 and 56 can be oriented generally along the longitudinal direction L and the lateral direction A. The bottom wall 56 is disposed between the top wall 54 and the substrate 46 when the board connector 26 is mounted to the substrate 46. Each of the side walls 52 can extend from the top wall 54 to the bottom wall 56.

The side walls 52 can each define a respective internal side surface 52a and an external side surface 52b opposite the internal side surface 52 along the lateral direction. The internal side surfaces 52a can face each other along the lateral direction A. The top wall 54 can define an internal top surface 54a and an external top surface 54b that is opposite the internal top surface 54a along the transverse direction T. The bottom wall 56 can define an internal bottom surface 56a and an external bottom surface 56b that is opposite the internal bottom surface 56a along the transverse direction T. The internal top surface 54a and the internal bottom surface 56a can face each other along the transverse direction T. The external bottom surface 56b can be configured to face the substrate 46 when the electrical board connector 26 is mounted to the substrate 46. The terms "top" and "bottom" are referenced herein with reference to the drawings, it being appreciated that the board connector 26 can be disposed in any orientation as desired during use.

The board connector housing 40 can further include first and second shoulders 62 that extend out from the side walls 52, respectively, of the housing body 45 along the lateral direction A. Thus, the housing body 45 can extend between the shoulders 62 along the lateral direction A. The shoulders 62 can define respective outer shoulder side surfaces 66 that are opposite each other along the lateral direction A. The outer shoulder side surfaces 66 can define the outermost side surfaces of the electrical board connector 26 with respect to the lateral direction A. Thus, the outer shoulder side surfaces 66 can be outwardly offset with respect to the external side surfaces 52b along the lateral direction A. Each of the shoulders 62 can further define a respective top shoulder surface 64 that is recessed with respect to the external top surface 54b along the transverse direction T. That is, the top shoulder surfaces 64 can be offset with respect to the external top surface 54b along a downward direction that is defined from the top wall 54 to the bottom wall 56. Accordingly, the external side surfaces 52b can define respective upper portions 53 that extend from the top shoulder surfaces 64 along an upward direction to the external top surface 54b. The upward direction is opposite the downward direction, and thus defined from the bottom wall 56 to the top wall 54. The upward and downward directions can be oriented along the transverse direction T.

The board connector housing 40 defines a mating portion 48 that is individually and selectively intermateable with the mating portion of the cable connectors 22. In one example, the mating portion 48 can include receptacle 50 that extends into a front end 41 of the board connector housing 40. In particular, the internal side surfaces 52a can extend from the internal top surface 54a to the internal bottom surface 56a. Thus, the internal side surfaces 52a and the internal top and bottom surfaces 54a and 56a can define an internal void that defines the receptacle 50. The receptacle 50 can extend to the front end 41 of the connector housing 40. In one example, the internal side surfaces 52a can define tapered lead-in regions that are tapered toward each other along the lateral direction A as they extend along the mating direction to the front end 41 of the board connector housing 40. Similarly, the internal top and bottom surfaces 54a and 56a can define tapered lead-in regions that are tapered toward each other along the transverse direction T as they extend along the mating direction to the front end 41 of the board connector housing 40.

The electrical board contacts 42 can be resiliently supported by the board connector housing 40, such that the mating portions 42a of the first and second rows 44a and 44b, respectively, are resiliently deflectable away from each other along the transverse direction T. For instance, the mating portions 42a can be suspended in the receptacle 50 at a location spaced in the rearward direction from the tapered portions of the internal side surfaces 52a and the internal top and bottom surfaces 54a and 56a. The internal top and bottom surfaces 54a and 56a can further define divider walls 58 and pockets 60 between the divider walls 58 along the lateral direction A. The pockets 60 are aligned with respective ones of the mating portions 42a along the transverse direction T. Thus, the board connector housing 40 does not interfere with the mating portions 42a when they resiliently flex away from each other along the transverse direction T as the board connector 26 is mated with a cable connector 22. The mating portions 42a of the first and second rows 44a and 44b, respectively, can flare away from each other along the transverse direction T as they extend in the forward direction to their respective free terminal ends.

The electrical board connector 26 can include any suitable number of board contacts 42 in each of the rows 44a and 44b. In one example, the board connector 26 can include greater than six electrical board contacts 42 in each of the rows 44a and 44b, such as approximately twenty electrical board contacts 42 in each of the rows 44a and 44b. The electrical board contacts 42 of each of the rows 44a and 44b can be spaced apart by any suitable center-to-center pitch along the lateral direction A. In one example, the center-to-center pitch can be in a range from approximately 0.5 mm to approximately 1 mm, including approximately 0.8 mm.

Figure 3B:
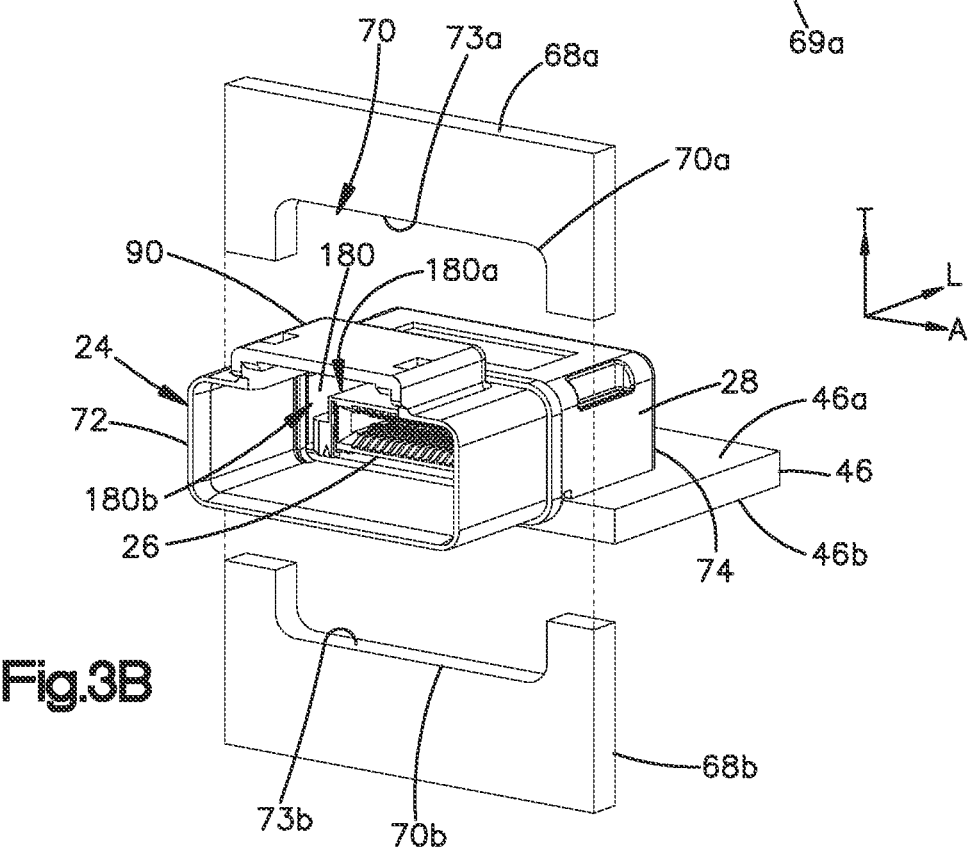
FIG. 3B is a perspective view showing an electrical board connector assembly being supported by a panel as shown in FIG. 3A.

Referring now to FIGS. 3A-3B, and as described above, the board connector assembly 24 includes can include the cage 28 that at least partially surrounds the board connector 26 when the cage 28 and the board connector 26 are mounted to the substrate 46. The data communication system 20 can further include a panel 68, such that the cage 28 is supported by the panel 68. In particular, the cage 28 can extend through an opening 70 that extends through the panel 68 along the longitudinal direction L from a front panel surface 69a to a rear panel surface 69b that is opposite the front panel surface 69a. The front panel surface 69a is spaced from the rear panel surface 69b in the forward direction. Accordingly, when the cage 28 is supported by the panel 68, and the board connector 26 are mounted to the substrate 46, the board connector 26 and the substrate 46 are likewise supported by the panel 68. In one example, the board connector assembly 20 can include a plurality of board connector assemblies 24 that are mounted to the panel 68. The shroud 74 can extend out with respect to the front panel surface 69a in the forward direction, and the cage body 73 can extend out with respect to the rear panel surface 69b in the rearward direction.

The board connector assemblies 24 can be arranged in an array on the panel 68, and can include substantially identical board connectors 26 and cages 28. Any of the cable connectors 22 can be intermateable with any of the board connectors 26 mounted on the panel 68. The array can include a plurality of rows that are oriented along the lateral direction, and a plurality of columns arranged along the transverse direction. It is recognized that different ones of the cable connectors 22 can be mated to different ones of the board connector assemblies 24 as desired. For instance, one or more of the board connector assemblies 24 that are supported by the panel 68 can be mated to a respective electrical cable connector 30 (see FIG. 1). Alternatively or additionally, one or more of the board connector assemblies 24 that are supported by the panel 68 can be mated to a respective optical cable connector 34 (see FIG. 1). Alternatively or additionally still, one or more of the board connector assemblies 24 that are supported by the panel 68 can be mated to a respective hybrid cable connector 38 (see FIG. 1).

Referring now to FIGS. 3A-3E, the cage 28 can be electrically insulative or can be electrically conductive to provide electromagnetic interference (EMI) shielding as desired. In one example, the cage 28 can be a metal. The cage 28 includes a cage body 72 that is configured to be mounted to the underlying substrate 46 and at least partially surround the board connector 26, and a shroud 74 that extends from the cage body 72 in the forward direction. Thus, the description of the cage body 72 and the shroud 74 apply equally to the cage 28. The cage 28 is configured to be inserted into the panel 68 such that the shroud 74 extends from the panel 68 in the forward direction, and the cage body 72 extends from the panel 68 in the rearward direction.

The cage body 72 includes a top wall 76a and first and second side walls 76b and 76c, respectively, that extend down from the top wall 76a. The first and second side walls 76b and 76c are opposite each other along the lateral direction A. The cage body further includes a rear wall 76d that extends down from the top wall 76a of the cage, and extends from the first side wall 76b to the second side wall 76c. The cage body 72 can include mounting pins 75 that extends down from the bottom of at least one or more up to all of the first and second side walls 76b and 76c and the rear wall 76d. The pins 75 can extend into openings of the substrate 46, and can be soldered to the substrate 46 at respective solder joints or otherwise secured to the substrate 46, so as to attach the cage 28 to the substrate 46. When the cage 72 is mounted to the substrate 46, the side walls 76b and 76c and the rear wall 76d extend between the substrate 46 and the top wall 76a of the cage body 72. The side walls 76b and 76c and the rear wall 76d cooperate so as to define an interior void 78 of the cage body 72. The interior void 78 extends down through an open bottom 76e of the cage body 72. The cage body 72 can be sized to extend through the opening 70 of the panel 68.

The cage 28 can have any suitable dimensions as desired. In one example, the cage body 72 can be miniaturized with respect to conventional cages. For instance, the cage body 72 has an internal width from respective inner surfaces of the first and second side walls 76b and 76c along the lateral direction A of no more than approximately 28 mm. The inner surfaces of the first and second side walls 76b and 76c face each other along the lateral direction A. For instance, the internal width can be approximately 28 mm. The cage body 72 can have an internal depth from a forward-facing surface of the rear wall 76d to the shroud 74 along the longitudinal direction L of no more than approximately 16 mm. For instance, the internal depth can be approximately 16 mm. The cage body 72 can have an internal height from a downward-facing surface of the top wall 76a to respective bottom surfaces of one or more up to all of the side walls 76b and 76c and the rear wall 76d along the transverse direction T of no more than approximately 10 mm. For instance, the internal height can be approximately 10 mm. The term "substantially," "approximately," "generally," derivatives thereof, and words of similar import as used herein with respect to a value, size, shape, direction, location, and other parameters can include the stated value, size, shape, direction, location, variances, and other parameters up to plus or minus 10% of the stated value or shape, location, and other parameters including 8%, 5%, 3%, 2%, and 1%, unless otherwise indicated.

The cage 28 can defines at least one window extending therethrough so as to place the board connector 26 in fluid communication with an ambient environment outside the cage 28 through the at least one window. In one example, the at least one window can be configured as a heat dissipation window configured to dissipate heat during a solder reflow operation that secures at least one or both of the cage 28 and the board connector 26 to the substrate 46. In one example, the at least one heat dissipation window can be configured as at least one upper heat dissipation window 110a that extends through the top wall 76a of the cage body 72 along the transverse direction T. The cage 28 can include a single upper heat dissipation window 110a or a plurality of upper heat dissipation windows 110a as desired. In addition to or as an alternative to the at least one upper heat dissipation window 110a, the at least one heat dissipation window can include at least one side heat dissipation window that extends through either or both of the first and second side walls 76a and 76b of the cage body 72. For instance, the at least one first side heat dissipation window can include a first side heat dissipation window 110b that extends through the first side wall 76a of the cage body 72 along the lateral direction A, and a second side heat dissipation window 110c that extends through the second side wall 76b of the cage body 72 along the lateral direction A. In addition to or as an alternative to at least one of the upper heat dissipation window and the at least one side heat dissipation window, the at least one heat dissipation window can include at least one rear heat dissipation window 110d that extends through the rear wall 76d of the cage body 72 along the longitudinal direction L. For instance, the at least one rear heat dissipation window 110d can include a plurality of rear heat dissipation windows 110d that are spaced from each other along the lateral direction. Laterally outermost ones of the rear heat dissipation windows 110d can also be open to the side heat dissipation windows, respectively. Alternatively, the at least one rear heat dissipation window 110d can be configured as a single rear heat dissipation window 110d. It should be appreciated that any of the heat dissipation windows can also provide a visualization window that allows for visual inspection of the solder joints of the board connector 26 to the underlying substrate 46. In one example, the heat dissipation windows can dissipate heat sufficiently during operation without any heat sinks that extend from the cage body 72, for instance through the upper heat dissipation window 110a.

With continuing reference to FIGS. 3A-3E, the shroud 74 has top and bottom shroud walls 80 and 82, respectively, and respective first and second side shroud walls 84 and 86 that extend from the top shroud wall 80 to the bottom shroud wall 82. The shroud walls 80-86 cooperate to define a shroud channel 88 having a front opening that extends into a front end 83 of the shroud 74. The shroud channel 88 can be open to the void 78 of the cage body 72. The front opening and the shroud channel 88 are sized to receive the mating interface of the cable connector 22 as the cable connector 22 is mated to the board connector 26. When the board connector 26 is mounted to the substrate 46, the cage 28 is configured to be mounted to the substrate 46 such that the outermost side surfaces of the board connector 26 are disposed between the first and second side walls 76b and 76c, respectively, of the cage body 72 with respect to the lateral direction A. Further, the top and bottom walls 54 and 56, respectively, of the board connector 26 are disposed between substrate 46 and the top wall 76a of the cage body 72 with respect to the transverse direction. Further still, the rear end of the board connector 26 can be disposed forward with respect to the rear wall 76d of the cage body 72. The shroud channel 88 can be aligned with the receptacle 50 along the longitudinal direction when the board connector 26 and the shroud 74 are mounted to the substrate 46. As shown in FIG. 3A, the bottom shroud walls 80 of the cages 28 of pairs of electrical board connector assemblies 24 can face each other and be at least partially or substantially entirely aligned with each other along the transverse direction T.

The bottom shroud wall 82 can define a bottom surface that is disposed below the top substrate surface 46a. For instance, the bottom surface of the bottom shroud wall 82 can be disposed between the top substrate surface 46a and the bottom substrate surface 46b. Further, in one example, no portion of the board connector 26 1) extends outward of a footprint of the substrate 46 in a plane that includes the lateral direction A and the longitudinal direction L and 2) extends below the top substrate surface 46a. As illustrated in FIG. 2D, the substrate 46 can include a main substrate portion 49 and a pair of laterally opposed legs 51 that extend forward from the main substrate portion 49. Accordingly, a gap 55 extends between the legs 51 along the lateral direction A. The electrical board connector 26 can be mounted to the main substrate portion 49 at a location in alignment with the gap 55 along the longitudinal direction L. The electrical board connector 26 can be flush with a front edge of the substrate 46 that partially defines the gap 55, or can be recessed from the front edge in the rearward direction. The cage 28, and in particular the shroud 74, can extend beyond an edge of the substrate 46 that partially defines the gap 55. At least a portion up to an entirety of the shroud 75 that extends forward with respect to the front panel surface 69a can be aligned with the gap 55. Accordingly, the cage 72 can be devoid of a bottom wall that 1) is elongate in a plane that includes the lateral direction A and the longitudinal direction L, and 2) that faces the substrate 46.

The shroud 74 further includes an attachment housing 90 that extends from a respective one of the shroud walls. In particular, the attachment housing 90 can include an attachment wall 92 that is outwardly offset with respect to the respective one of the shroud walls. In one example, the attachment wall 92 can be a top attachment wall that is upwardly spaced with respect to the top shroud wall 80, and secured to the top shroud wall 80. For instance, the attachment housing 90 can include first and second side attachment walls 94 and 96 that extend from the attachment wall 92 to the top shroud wall 80. Alternatively, the attachment wall 92 can be attached directly to the top shroud wall 80. The top attachment wall 92 alone or in combination with the side attachment walls 94 and 96 can define an attachment void 98 that is open to the shroud channel 88. For instance, the top attachment wall 92 alone or in combination with the side attachment walls 94 and 96 can define an attachment void 98 that is open to the shroud channel 88 in the downward direction.

The attachment housing 90 can further include at least one attachment member 100 that is configured to releasably attach to the cable connector 22 when the cable connector 22 is mated with the board connector 26. In this regard, the attachment member 100 can be configured as a latch member 158. In one example, the attachment member 100 can include an engagement wall 102 that extends along an interior surface 92a of the top attachment wall 92 that faces the top shroud wall 80. Alternatively, the engagement wall 102 can extend along an interior surface of one of the side attachment walls 94 and 96 that faces the other of the side attachment walls 94 and 96. The engagement wall 102 further defines the recess 104 that extends therein. As will be described in more detail below, the recess 104 can be configured to receive a complementary latch member of the cable connector 22 so as to releasably secure the cable connector 22 to the board connector assembly 24 when the cable connector 22 is mated with the board connector 26. While the attachment member 100 has been described in accordance with one example, it is appreciated that the attachment member 100 can be alternatively configured as desired.

At least a portion of the shroud 74 can be outwardly offset with respect to the cage body 72, such that the shroud 74 is sized greater than the opening 70 that extends through the shroud 74. For instance, the top shroud wall 80 can be upwardly offset from the top wall 76a of the cage body 72. The bottom shroud wall 82 can be downwardly offset from the bottom end of the first and second side walls 76b and 76c of the cage body 72. The first and second side shroud walls 84 and 86 can be outwardly offset with respect to the first and second side walls 76b and 76c, respectively, of the cage body 72 along the lateral direction A.

Referring to FIG. 3B, the panel 68 can be secured to the cage 28 directly or indirectly in any manner as desired. In one example, the panel 68 can include first and second panel portions 68a and 68b that are opposite each other along the transverse direction define respective first and second portions 70a and 70b of the opening 70. In particular, the first panel portion 68a can define a first surface 73a that defines the first portion 70a of the opening 70, and the second panel portion 68b can define a second surface 73b that defines the second portion 70b of the opening 70. Thus, the first panel portion 68a can be brought toward the top wall 76a of the cage body 72 in the downward direction, and the second panel portion 68b can be brought toward the bottom end of the cage body 72, and in particular toward the bottom ends of the side walls 76b and 76c of the cage body 72. The first and second panel portions 68a and 68b can be brought substantially against each other so as to define the opening 70, and can further be brought against the cage 28 such that the cage 28 extends through the opening 70. The panel 68 can include a forward surface 71a and a rearward surface 71b.

The cage 28 can include a seal 108 that extends around at least a portion up to an entirety of the cage body 72. The seal 108 can be oriented substantially along a plane that is defined by the transverse direction T and the lateral direction A. The seal 108 can be a compressible elastomeric seal in some examples. For instance, the seal 108 can be made of silicone or any suitable alternative material as desired. The seal 108 can be aligned with the first and second panel portions 68a and 68b in the plane that is defined by the transverse direction T and the and lateral direction A as the first and second panel portions 68a and 68b are brought against the cage 28. Thus, the first and second surfaces 73a and 73b are brought against the seal 108, thereby compressing the seal, as the first and second panel portions 68a and 68b are brought against the cage 28. The seal 108 thereby creates a barrier with respect to passage of particulates and liquid through the opening 70. The panel 68 can be secured directly or indirectly to the cage 28 in any manner desired. For instance, hardware can secure the panel 68 to the cage 28 in one example. In another example, the substrate 46 can be secured to the panel 68. Other examples are envisioned.

Figure 4A:
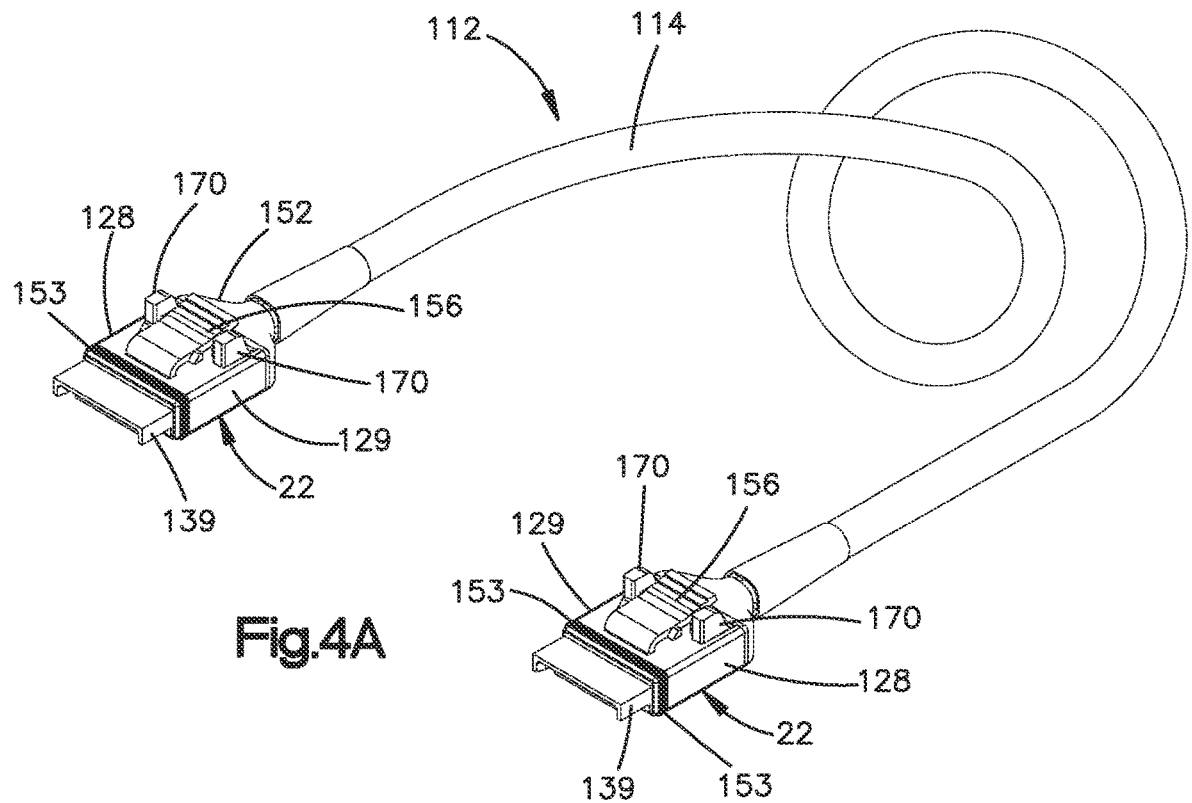
FIG. 4A is a perspective view of a cable assembly including a data communication cable and a pair of cable connectors mounted to opposed ends of the data communication cable.

Referring now to FIGS. 1 and 4A, the data communication system can include a cable assembly 112 having at least one cable 114 and at least one cable connector 22 mounted to a respective end of the at least one cable 114. For instance, the cable assembly 112 can include first and second cable connectors 22 mounted to opposite ends of the at least one cable 114. The at least one cable 114 can be configured as a bundle of cables. The cable connector 22 can be configured as an electrical cable connector configured to be mounted to electrical cables 32 and no optical cables so as to define an electrical cable assembly, an optical cable connector 34 configured to be mounted to optical cables or fibers 36 and no electrical cables 32 so as to define an optical cable assembly, or a hybrid cable connector configured to be mounted to both electrical cables 32 and optical fibers 36 so as to define a hybrid cable assembly.

Figure 4B:
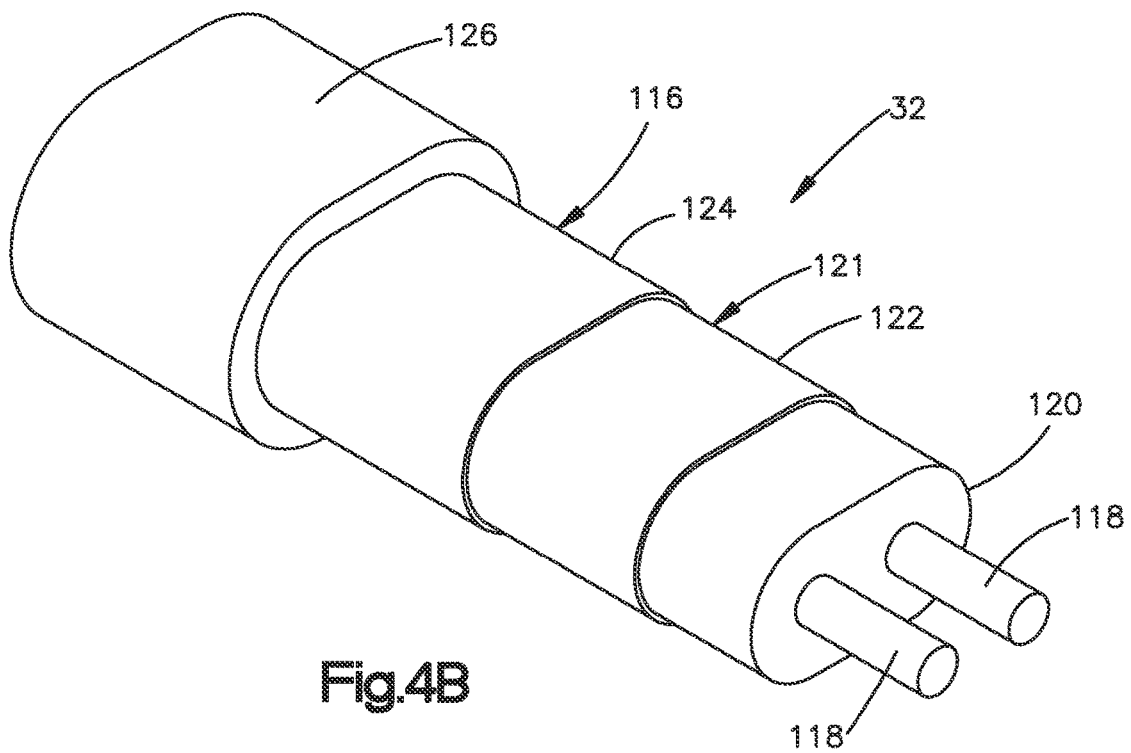
FIG. 4B is a perspective view of a twin axial cable in one embodiment.

Referring now to FIG. 4B, the electrical cables 32 can include twin axial cables 116 each having a pair of electrical signal conductors 118 that are spaced from each other, and an inner dielectric 120 that surrounds the signal conductors 118. The signal conductors 118 can be copper or any suitable electrically conductive material. As will be appreciated from the description below, the signal conductors 118 of each of the twin axial cables 116 can be configured as electrical transmit conductors that transmit electrical signals to the board connector 26, or electrical receive conductors that receive electrical signals from the board connector 26. The twin axial cables 116 can each have at least one electrical layer 121 that surrounds the inner electrical insulator 120. The at least one electrical layer 121 can include an electrical shield 122 that surrounds the inner electrical insulator 120 and provides electrical shielding for the signal conductors 118. If desired, the at least one electrical layer 121 can further include a metalized barrier 124 that surrounds the electrical shield 122. The at least one electrical layer 121 further includes an outer electrically insulative jacket 126 that surrounds the at least one electrical layer 121. Thus, the jacket 126 can define the outer surface of the twin axial cables 116. The outer electrically insulative jacket 126 can be coextruded with one or more up to all of the signal conductors 118, the inner dielectric 120, and the at least one electrical layer 121. The electrical signal conductors 118 of each twin axial cable 116 can define a differential signal pair as desired. As will be further appreciated from the description below, some of the electrical cables can also be configured as coaxial cables 116 each having a single electrical signal conductor, an inner dielectric that surrounds the signal conductor, an electrical conductive shield that surrounds the inner dielectric, and an outer electrically insulative jacket that surrounds the electrical shield. Thus, both the twin axial cable 116 and the coaxial cable can be devoid of a drain wire. Alternatively, one or both of the twin axial cable 116 and the coaxial cable can include a drain wire that is mounted to a ground mounting pad.

Referring now to FIGS. 2A and 4A-4F, the cable connector 22, including the electrical cable connector 30, the optical cable connector 34, and the hybrid cable connector 38, includes an electrically insulative cable connector housing 128 and a substrate or card 130 that is supported by the cable connector housing 128. The cable connector housing 128 includes a housing body 129 and a mating interface 139 that extends from the housing body 129 in the forward direction. The card 130 can be supported by the housing body 129. The cable connector housing 128 is sized to be received by the shroud channel 88 of the cage 28. In one example, the cable connector housing 128 can be a one-piece unitary housing. The card 130 can be configured as a printed circuit board, also referred to as a card, that has a mating portion 142a configured to mate with the electrical contacts 42 of the board connector 26 when the cable connector 30 is mated with the board connector 26 along a respective forward direction. The card can be configured as an edge card whereby an edge is inserted into the receptacle 50 of the board connector 26 so as to mate the cable connector 22 to the board connector 26. The forward direction of the cable connector 30 is opposite the forward direction of the board connector 26.

When the cable connector 30 is mated with the board connector 26 through the channel 88 of the shroud 74, only the mating interface 139 and the card 130 extend over the substrate 46 in alignment with the substrate 46 along the transverse direction T. A portion of the cable connector 30 that is disposed in the shroud channel 88 can extend below the top surface 46a of the substrate 46, and can be disposed between the top and bottom surfaces 46a and 46b with respect to the transverse direction T.

The electrical cable connector 30 further includes a plurality of electrical cables 32 that extend through the cable connector housing 128 and are mounted to the card 130. The card 130 defines a top card surface 130a and a bottom card surface 130b opposite the top card surface 130a along the transverse direction T. The card 130 includes a plurality of electrical conductors or traces each including an electrical mating contact pad 138 and an electrical mounting termination or pad 140 spaced from the contact pad 138 in the rearward direction. The card 130 can include a plurality of contact pads 138 at a mating portion 142a of the card 130, and a plurality of mounting pads 140 at a mounting portion 142b of the card 130. The card 130 can be devoid of electrically conductive pads or electrical contacts between the rear end of the card 130 and the electrical contacts at the mating portion 142a of the card.

Respective ones of the electrical traces are configured as signal traces, and respective ones of the electrical traces can be configured as ground traces. The contact pads 138 of the signal traces can be thus configured as electrical signal contact pads, and the ground pads of the electrical ground traces can be referred to as ground contact pads. The electrical signal contact pads and the ground contact pads can be arranged in a repeating S-S-G pattern along a respective row, wherein "S" denotes an electrical signal contact pad, and "G" denotes an electrical ground contact pad. Other patterns are envisioned, such as S-S-G-G. In one example, the mounting pads of the electrical ground traces can be electrically commoned together so as to define an electrically conductive ground bar 144 that is in electrical communication with the ground contact pads. The ground bar 144 can be elongate along the lateral direction A, and spaced from the mounting pads 140 in the rearward direction.

The contact pads 138 and mounting pads 140 can be arranged in a respective at least one row that is oriented along the lateral direction A. The contact pads 138 can be spaced from each other along a center-to-center pitch along the respective row that is equal to the center-to-center pitch of the electrical contacts 42 of the board connector 26. Thus, the center-to-center pitch of the contact pads 138 can be in a range from approximately 0.5 mm to approximately 1 mm, including approximately 0.8 mm. In one example, the contact pads 138 and the mounting pads 140 can be arranged along respective first rows 146a and 148a that are oriented along the lateral direction A. The first rows 146a and 148a can be defined at the top card surface 130a. The contact pads 138 and the mounting pads 140 can be arranged along respective second rows 146b and 148b that are oriented along the lateral direction A. The second rows 146b and 148b can be defined at the bottom card surface 130b. It should be appreciated, of course, that the first rows 146a and 148a can alternatively be defined at the bottom card surface 130b, and the second rows 146b and 148b can alternatively be defined at the top card surface 130a. The card 130 can further include a first ground bar 144a at the top card surface 130a, and a second ground bar 144b at the bottom card surface 130b.

The electrical cables 32 are configured to be mounted to the electrical cable connector 30, such that the electrical signal conductors 118 are mounted to respective ones of the mounting pads 140, thereby placing the electrical signal conductors 118 in electrical communication with respective electrical signal contact pads 138 of the plurality of electrical signal contact pads 138. The at least one electrical layer 121 of the electrical cables 30 can be mounted to the ground bar 144 when the signal conductors 118 are mounted to the mounting pads 140, and thus can be electrically commoned together. The electrical layers 121 are rearwardly spaced from the signal mounting pads 140 so as to be electrically isolated from the signal mounting pads 140. It is recognized that the card 130 can alternatively include a plurality of individual ground mounting pads 140 if desired. The electrical cables 32 can include a first plurality of electrical cables 32a that are configured to be mounted to first row 148a of mounting pads 140 at the top card surface 130a, and a second plurality of electrical cables 32b that are configured to be mounted to the second row 148b of mounting pads 140 at the bottom card surface 130b.

Exposed portions of the electrical signal conductors 118 can extend forward from the inner dielectric 120, the at least one electrical layer 121, and the outer electrically insulative jacket 126 so as to mount to respective ones of the mounting pads 138. A magnetic absorber such as a ferrite tube or sleeve or alternative magnetic absorber can be placed either inside or around the cable connector housing 128 as desired so as to shield the electrical conductors 118 that mate with the mounting pads 40 of the respective card, thereby preventing eddy currents from being generated at the exposed portions of the electrical signal conductors 118 when driving through a magnetic field, such as the type that can be produced when driving under electrical power wires.

In one example, the first plurality of electrical cables 32a includes twin axial cables 116 as described above. Similarly, the second plurality of electrical cables 32b includes twin axial cables 116 as described above. Additionally, at least one or both of the first and second pluralities of electrical cables 32a and 32b can include at least one coaxial cable 117. In one example, the second plurality of electrical cables 32b can include one or more coaxial cables 117. The coaxial cables 117 can be configured as a clock conductor or low-speed PCIE customizable sideband conductors.

The twin axial cables 116 of one of the first plurality of electrical cables 32a and the second plurality of electrical cables 32b can be configured as electrical transmit cables that are configured to transmit electrical signals to the board connector 26. The twin axial cables 116 of the other of the first plurality of electrical cables 32a and the second plurality of electrical cables 32b can be configured as electrical receive cables that are configured to receive electrical signals from the board connector 26. In one example, the twin axial cables 116 of the first plurality of electrical cables 32a can be configured as electrical transmit cables, and the twin axial cables 116 of the second plurality of electrical cables 32b can be configured as electrical receive cables. Thus the contact pads 138 at the top card surface 130a can be configured as electrical transmit contact pads 138 that transmit electrical signals to respective electrical receive contacts of the electrical board contacts 42. The contact pads 138 at the bottom card surface 130b can be configured as electrical receive contact pads 138 that receive electrical signals from respective electrical transmit contacts of the electrical board contacts 42. It should be appreciated that the twin axial cables 116 of the first plurality of electrical cables 32a can alternatively be configured as electrical receive cables, and the twin axial cables 116 of the second plurality of electrical cables 32b can alternatively be configured as electrical transmit cables. Alternatively still, one or both of the first and second pluralities of electrical cables 32a and 32b can include both electrical transmit cables and electrical receive cables. While the electrical transmit cables and the electrical receive cables can be defined by twin axial cables 116 of the type described herein, the electrical transmit cables and the electrical receive cables can be defined by any suitable alternative electrical cables as desired.

The mating portion 142a of the card 130 can be inserted into the electrical board connector 22 such that the first row 146a of electrical contact pads 138 are placed into contact, and thus electrical communication with, the mating portions 42a of the first row 44a of electrical board contacts 42, and such that the second row 146b of electrical contact pads 138 are placed into contact, and thus electrical communication with, the mating portions 42a of the second row 44b of electrical board contacts 42. Thus, the first plurality of electrical cables 32a are placed in electrical communication with the first row 44a of electrical board contacts 42, and the second plurality of electrical cables 32b are placed in electrical communication with the second row 44b of electrical board contacts 42. It is appreciated that depending on the number of electrical cables 32, some of the contact pads 138 of the first and second rows 146a and 146b may be inactive, that is not in electrical communication with any of the electrical cables 32.

In one example, the data communication system 20, including the board connector 26 and the cable connector 22, can be configured to transmit and receive electrical signals at high data transfer speeds per lane. A lane can be defined by a differential pair of transmit signals and a differential pair of receive signals. For instance, the data communication system 20 can be configured to transmit and receive electrical signals at speeds equal to or greater than approximately 10 gigabits/second with no more than 6% worst-case asynchronous multi-active crosstalk per lane. In one example, the data communication system 20 can be configured to transmit and receive electrical signals at speeds equal to or greater than approximately 16 gigabits/second with no more than 6% worst-case asynchronous multi-active crosstalk per lane. For instance, the data communication system 20 can be configured to transmit and receive signals at speeds equal to or greater than approximately 25 gigabits/second with no more than 6% worst-case asynchronous multi-active crosstalk per lane. Further, the data communication system 20 can be configured to transmit and receive signals at speeds equal to or greater than approximately 28 gigabits/second with no more than 6% worst-case asynchronous multi-active crosstalk per lane. In one example, the data communication system 20 can be configured to transmit and receive signals at speeds up to approximately 32 gigabits/second with no more than 6% worst-case asynchronous multi-active crosstalk per lane. Thus, in one example, the data communication system 20 can be configured to transmit and receive signals at speeds from approximately 10 gigabits/second to approximately 32 gigabits/second with no more than 6% worst-case asynchronous multi-active crosstalk per lane, such as approximately 11 gigabits/second, approximately 12 gigabits/second, approximately 13 gigabits/second, approximately 14 gigabits/second, approximately 15 gigabits/second, approximately 16 gigabits/second, approximately 17 gigabits/second, approximately 18 gigabits/second, approximately 19 gigabits/second, approximately 20 gigabits/second, approximately 21 gigabits/second, approximately 22 gigabits/second, approximately 23 gigabits/second, approximately 24 gigabits/second, approximately 25 gigabits/second, approximately 26 gigabits/second, approximately 27 gigabits/second, approximately 28 gigabits/second, approximately 29 gigabits/second, approximately 30 gigabits/second, and approximately 31 gigabits/second.

Figure 4C:
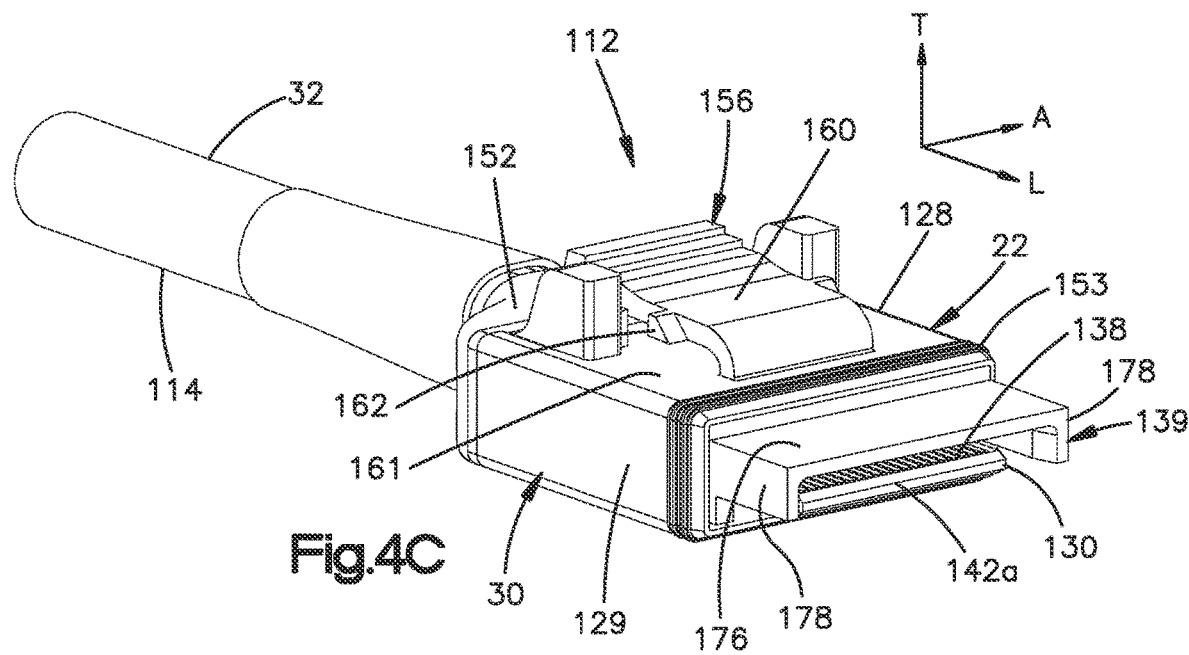
FIG. 4C is a perspective view of one of the cable connectors illustrated in FIG. 4A shown mounted to one end of the data communication cable.
Figure 4D:
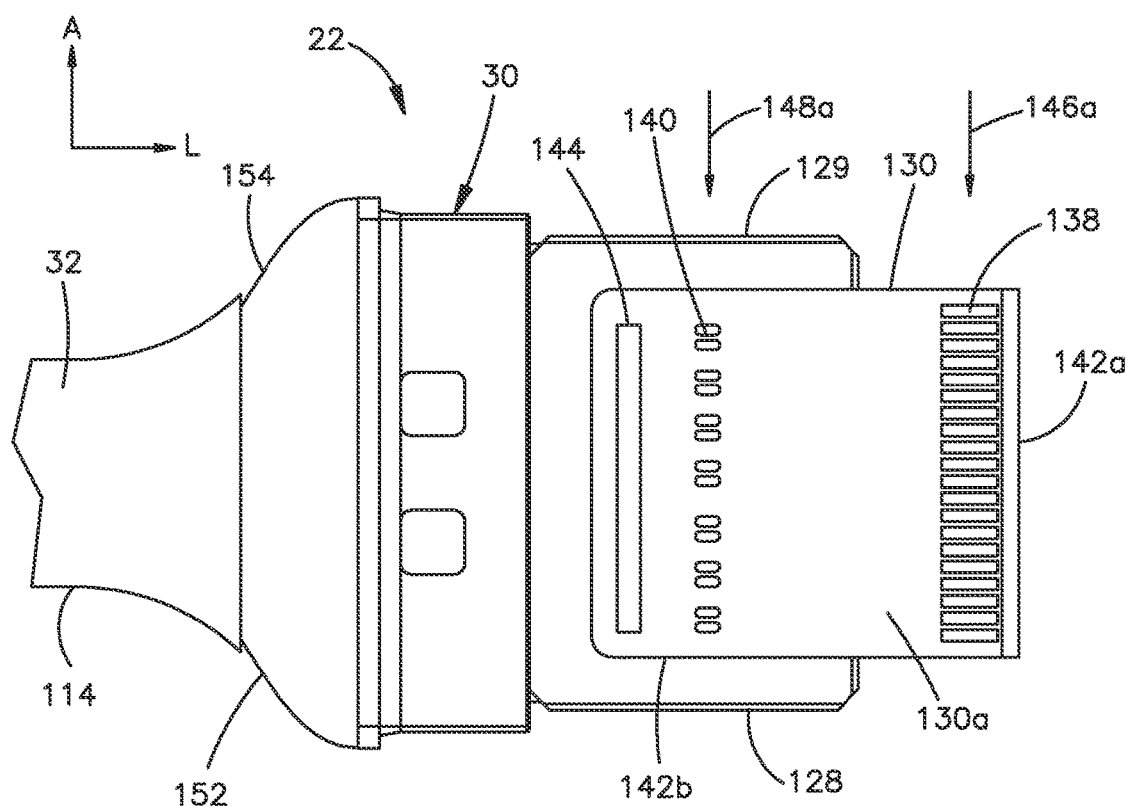
FIG. 4D is a top plan view of the cable connector of FIG. 4C shown with the housing removed, wherein the cable connector is configured as an electrical cable connector.
Figure 4E:
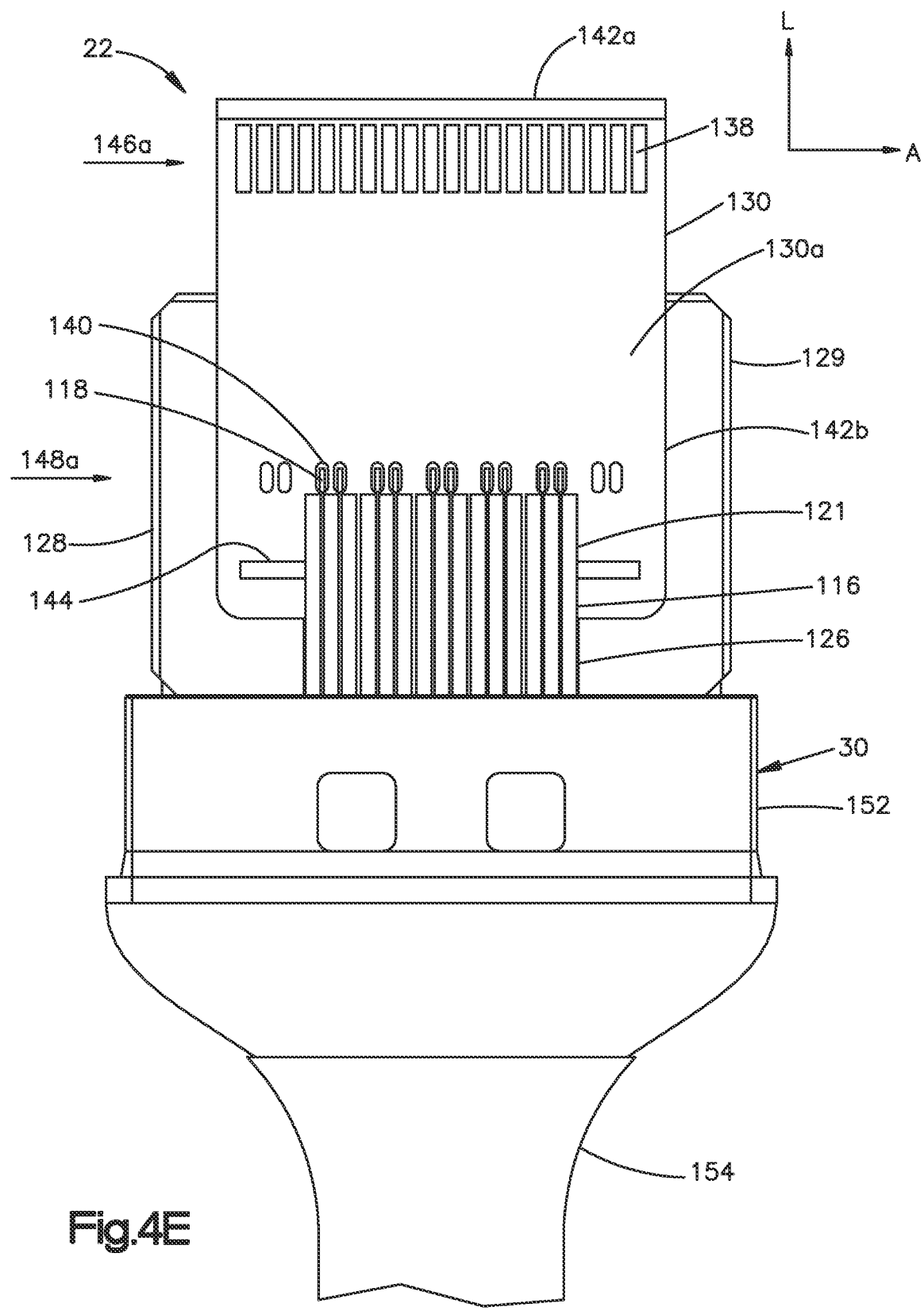
FIG. 4E is the top plan view of the electrical cable connector of FIG. 4D, shown mounted to the data communication cable configured as a plurality of electrical cables.

Referring now to FIGS. 4A, 4C, and 4D, the cables 114 can extend through an open rear end of the cable connector housing 128 at a cable-housing interface. The cable connector 22 can further include a guard 152 that seals the cable-housing interface. In particular, the guard 152 can extend from the cable connector housing 128 rearward to the cables 114. In one example, the guard 152 can be overmolded onto the connector housing 128 rearward to the cables 114, and can also be overmolded onto the rear end of the card 130. The guard 152 can be electrically insulative, and can seal the rear end of the connector hosing 128 with respect to ingress of dust, liquid and other debris into the cable connector housing 128 at the cable-housing interface. The cable connector 22 can further include a shrink tube 154 that extends along a rear end of the guard and along a portion of the outer surface of the cables 114. Thus, the shrink tube 154 can cover and seal an interface between the cables 114 and the guard 152. During fabrication, the shrink tube 154 can be applied to the guard 152 and the cables 114, and subjected to heat that causes the shrink tube 154 to shrink and seal against the guard 152 and the cables 114.

Referring now to FIGS. 3E and 4C in particular, and as described above, the data communication assembly can be compliant with the mechanical shock and vibration requirements of the USCAR-2 standards described above. In one example, the cable connector 22 can be secured to the board connector assembly 24 such that the cable connector 22 is force-decoupled from the board connector 26. Accordingly, mechanical forces that are applied to the cable connector 22, including the at least one cable 114, are transmitted to the cage 28 and the substrate 46 while bypassing the board connector 26.

In one example, the cable connector 22 can include a include a cable connector seal 153 that extends about and surrounds at least a portion up to an entirety of the outer surface of the cable connector housing 128. The seal 153 can be oriented substantially along a plane that is defined by the transverse direction T and the lateral direction A. The seal 153 can be a compressible elastomeric seal in some examples. For instance, the seal 153 can be made of silicone or any suitable alternative material as desired. As the cable connector 22 is mated with the board connector 26, the seal 153 can compress between the cable connector housing 128 and the interior surface of the shroud 74. The seal 153 thereby creates a barrier with respect to passage of particulates and liquid splash through the shroud channel 88 and through an interface between the cable connector 22 and the cage 28.

The cable connector 22 can include a cable latch member 156 that is configured to engage a board latch member 158 of the board connector assembly 24 so as to releasably secure the cable connector 22, and thus the cable assembly 112, to the board connector assembly 24 when the cable connector 22 is mated with the board connector 26. The cable latch member 156 can be supported by the cable connector housing 128 or any other structure of the cable assembly 112 as desired. In one example, the cable latch member 156 extends from the cable connector housing 128. For instance, the cable latch member 156 can be monolithic with the cable connector housing 128 or can be separately attached to the cable connector housing 128. The board latch member 158 of the board connector assembly 24 can be supported by the cage 28. The cable latch member 156 is movable between an engagement position and a disengagement position. When the cable latch member 156 is in the engagement position, the cable latch member 156 is configured to engage the board latch member 158 so as to secure the cable assembly 112 to the board connector assembly 24, thereby preventing the cable connector 22 from being unmated from the board connector 26. When the cable latch member 156 is in the disengagement position, the cable connector 22 can be unmated from the board connector 26. The cable latch member 156 is naturally biased to the engagement position.

As illustrated in FIG. 4C, the cable latch member 156 can include a latch arm 160 that extends from an external surface of the cable connector housing 128. For instance, the latch arm 160 can extend upward from a top surface 161 of the cable connector housing 128, and in particular of the housing body 129. The latch arm 160 can further extend rearward so as to be cantilevered above the top surface 161. The cable latch member 156 further includes at least one projection 162 that extends out from the latch arm 160 and is suspended over the top surface of the cable housing 128, and in particular of the housing body 129. The at least one projection 162 can be configured as first and second projections.

The projections 162 can extend out from respective first and second sides of the latch arm 160 along the lateral direction A. The sides of the latch arm 160 are opposite each other along the lateral direction A. In one example, the projections 162 do not extend beyond respective top and bottom surfaces of the latch arm 160 with respect to the transverse direction T, though the projections 162 can be alternatively configured as desired. In one example, the projections 162 are substantially flush with the top and bottom surfaces of the latch arm 160. The projections 162 can have beveled front surfaces that provide lead-in surfaces that engage complementary lead-in surfaces of the board latch member 158 as the latch members 156 and 158 engage each other. The latch arm 160 can be resilient, such that an inward or downward force applied to the latch arm 160 toward the cable connector housing 128 causes the projections 162 to correspondingly deflect inward or downward from their respective initial positions to respective deflected positions. When the projections 162 are in their respective initial positions, the cable latch member 156 is in the engagement position. When the projections 162 are in their deflected positions, the cable latch member 156 is in the disengagement position.

Referring also to FIG. 3E, the board latch member 158 includes the at least one recess 104 that extends up into an inner surface of the engagement wall 102 that faces downward. The at least one recess 104 is sized and position to receive the at least one projection 162 when the cable latch member 156 is in the engagement position. The recess 104 can be open to the shroud channel. The at least one recess 104 can be configured as a pair of recesses that are opposite each other along the lateral direction A. In one example, the inner surfaces of the engagement wall 102 that define the recesses 104 can be downwardly offset from the inner surface 92a of the top attachment wall 92 that extends along the lateral direction A between the engagement walls 102. For instance, the engagement walls 102 can extend down from the inner surface 92a of the top attachment wall 92. In one example, the engagement walls 102 can be opposite each other along the lateral direction A. The engagement walls 102 define respective beveled front surfaces that are configured to ride along the beveled front surfaces of the projections 162 of the cable latch member 156.

As the cable connector 22 is mated with the board connector 26 and the latch arm 160 is inserted into the attachment void 98, and the beveled front surfaces of the projections 162 ride along the beveled front surfaces of the laterally outer portions of the top attachment wall 92, thereby causing the latch arm 160 to deflect inward or downward such that the projections 162 ride along respective inner or lower surfaces of the engagement walls 102. The latch arm 160 provides a resilient force that biases the projections outward or upward opposite the direction of deflection of the latch arm 160. The projections 162 travel in the forward direction of the cable connector 22, or the rearward direction of the board connector 26, until the card 130 is mated with the electrical contacts 42, at which point the projections 162 deflect out into the recesses 104 to the engagement position and are captured by the engagement walls 102. Mechanical interference between the projections 162 and the engagement walls 102 prevents the cable connector from moving forward and rearward with respect to the cage 28. Accordingly, forces imparted onto the cable connector 22 during operation are communicated through the cable latch member 156 to the cage 28 and the underlying substrate 46 without being absorbed by the board connector 26. Otherwise stated, mechanical shock and vibration forces imparted onto the cable connector 22 can be mechanically isolated from the board connector 26. When it is desired to unmate the cable connector 22 from the board connector 26, the latch arm 160 is depressed toward the cable connector housing 128 to the disengagement position, thereby causing the projections 162 to deflect out of the recesses 104.

Referring again to FIGS. 4C and 4G, the cable connector 22 can further include at least one guard post 170 such as a pair of guard posts 170 that extend out with respect to the cable connector housing 128 to a location outwardly offset with respect to the latch arm 160. The guard posts 170 can extend out from the top surface 161 of the cable connector housing 128, and in particular of the connector housing body 129. Alternatively, the guard posts 170 can extend out from the guard 152. The guard posts 170 extend to a location above the latch arm 160. The latch arm 160 can be disposed between the guard posts 170 with respect to the lateral direction A. During operation, if an item falls on the cable connector 22, the guard posts 170 would absorb the impact, thereby preventing the latch arm 160 from receiving the impact that could otherwise depress the latch arm from its engagement position to its disengagement position. In one example, the guard posts 170 can extend out from the guard 152, though the guard posts 170 can alternatively extend out from the cable connector housing 128 as desired.

Referring now to FIGS. 3A-3B and 4C, the board connector assembly 24 can define a mating interface 172. The mating interface 139 of the cable connector 22 is sized to nest inside the mating interface 172. The mating interface 139 of the cable connector housing 128 can extend forward from the housing body 129 of the cable connector housing 128. In one example, the cable connector housing 128 can define an inward step from the housing body 129 to the mating interface 139. Thus, the mating interface 139 can be inwardly offset with respect to the housing body 129 along either or both of the lateral direction A and the transverse direction T. In particular, the mating interface 139 can be inwardly offset with from respective outer side surfaces of the housing body 129 with respect to the lateral direction. Further, the mating interface 139 can be inwardly offset with from the outer top surface of the housing body 129 with respect to the transverse direction. Thus, an entirety of the mating interface 139 can be inwardly offset with respect to the housing body 129 in a plane that is normal to the longitudinal direction.

Figure 4G:
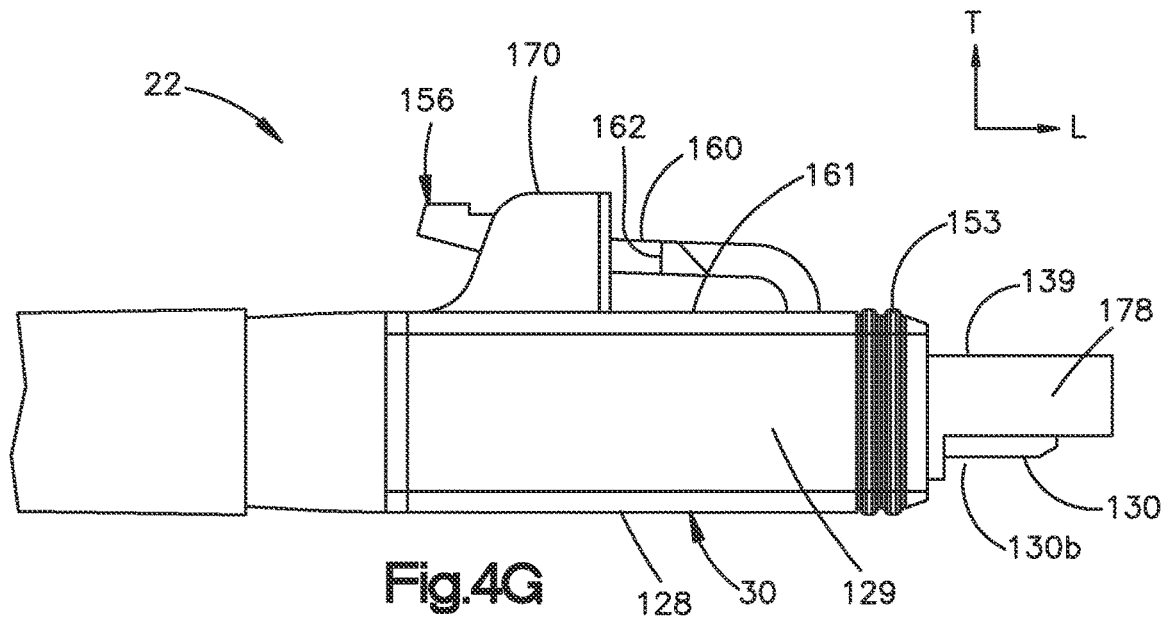
FIG. 4G is a side elevation view of the cable connector of FIG. 4C.

The mating interface 139 can define an "inverted U" shape. In particular, the mating interface 139 can define a top wall 176 that is elongate along the lateral direction A, and a pair of side walls 178 that extend down from the top wall 176 along the transverse direction T. The top wall 176 can be disposed between the card 130 and the top surface of the housing body 129 of the cable connector housing 128 with respect to the transverse direction T. As illustrated in FIG. 4G, the side walls 178 can extend down to a location that is between the top surface 46a of the substrate 46 and the bottom surface 46b of the substrate along the transverse direction T. The mating interface 139, including any one up to all of the top wall 176 and the side walls 178 can extend to a location spaced from the card 130 in the forward direction. The top wall 176, the side wall 178 of the mounting interface 139, and all walls described herein, can be planar or curved as desired.

With continuing reference to FIGS. 3B and 4C, the mating interface 172 of the board connector assembly 24 is configured to receive the mating interface of the housing body 129 of the cable connector housing 128. The board connector housing 40 and the cage 28 can combine so as to define the mating interface 172. In particular the mating interface 172 can be defined by a void 180 that extends between the board connector housing 40 and the cage 28. The void 180 is configured to receive the mating interface 139 of the cable connector 22 such that the mating interface 139 nests in the void 180 when the cable connector 22 is mated to the board connector 26. In particular, the void 180 includes a top portion 180a that extends between the top wall 54 of the housing body 45 and the bottom surface of the top wall 76a of the cage body 72 along the transverse direction T. The top portion 180a of the void 180 can be elongate along the lateral direction A. The top portion 180a can be sized to receive the top wall 176 of the mating interface 139. The void 180 can further include first and second side portions 180b that are open to the top portion 180a. The side portions 180b extend from the top shoulder surfaces 64 of the shoulder 62, respectively, to the top wall 76a of the cage body 72 along the transverse direction T. The side portions 180b are configured to receive the side walls 178 of the mating interface 139.

Figure 5A:
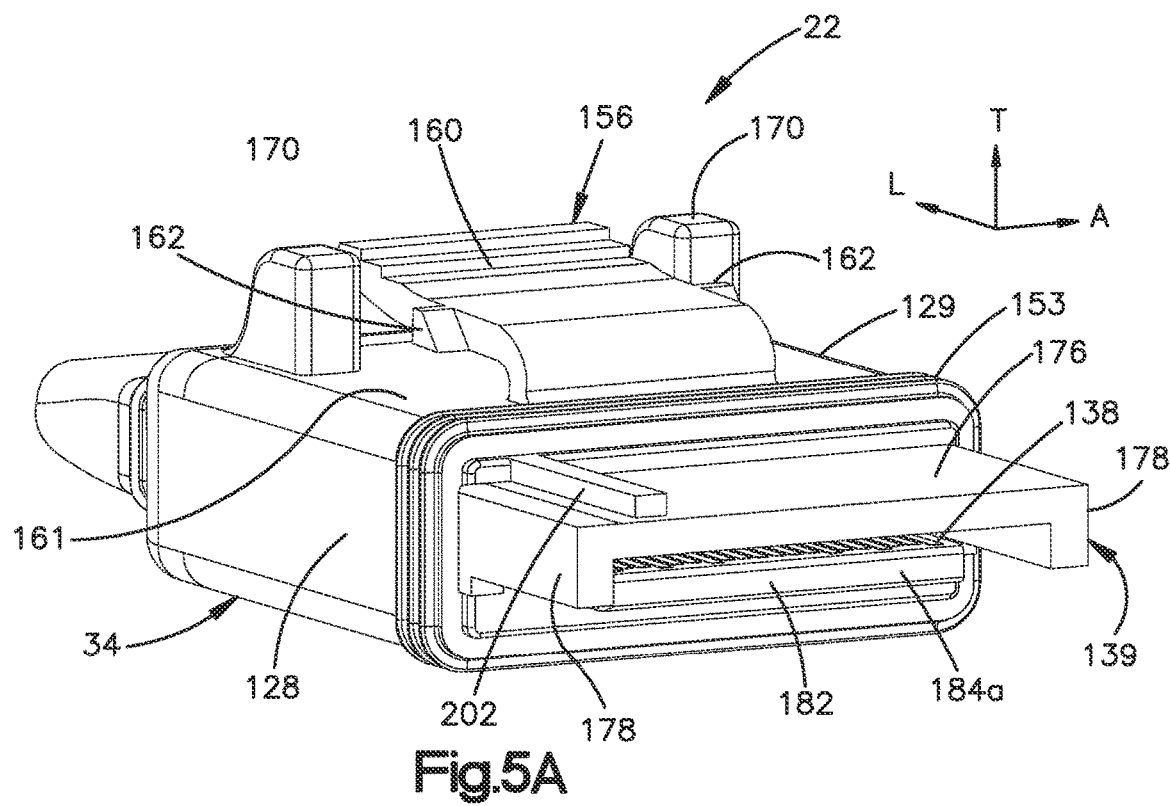
FIG. 5A is a perspective view of a cable connector configured as an optical cable connector.
Figure 5B:
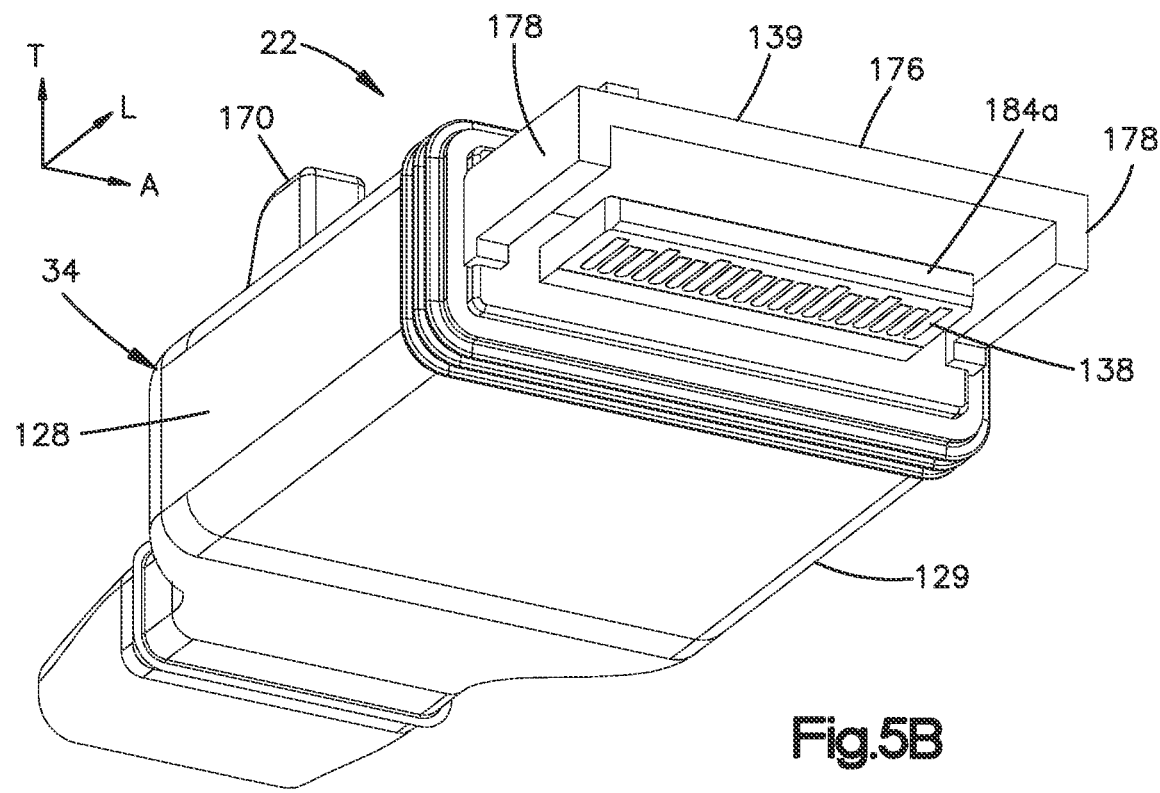
FIG. 5B is another perspective view of the optical cable connector of FIG. 5A.
Figure 5C:
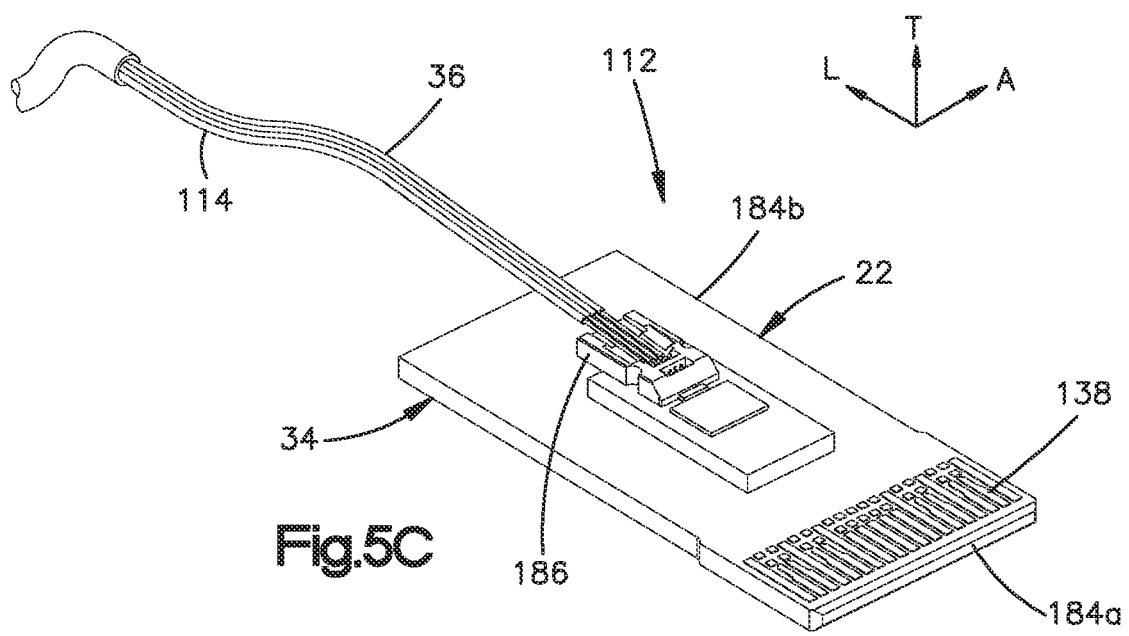
FIG. 5C is a perspective view of a portion of the optical cable connector of FIG. 5A shown mounted to the data communication cable configured as a plurality of optical cables.

Referring now to FIGS. 5A-5C, and as described above, the cable connector 22 can be configured as an optical cable connector 34 that is mounted to the cables 114 configured as optical cables or fibers 36 and no electrical cables 32. As shown in FIGS. 5A-5B, the optical cable connector 34 includes the cable connector housing 128 as described above. Thus, the optical cable connector 34 further includes the mating interface 139 of the connector housing 128. As a result, the mating interface 139 of the optical cable connector 34 is substantially identical with respect to the mating interface 139 of the electrical cable connector 30 described above. Further, the optical cable connector 34 includes a transceiver substrate 182 that is supported by the cable connector housing 128, and in particular by the housing body 129 in the manner described above. The substrate 182 has a mounting portion 184a configured to be mounted to a plurality of optical fibers 36, and a mating portion 184b that is configured to be received in the receptacle 50 of the board connector 26 between the first and second rows 44a and 44b in the manner described above, so as to mate the optical cable connector 34 to the board connector 26.

The substrate 182 can be configured as a card or a transceiver substrate. The optical cable connector can include an optical transceiver 186 that includes an optical engine 188 that is mounted to the transceiver substrate 182. The optical engine 188 is mounted to the transceiver substrate 182, and is configured to receive electrical receive signals from the board connector 26, convert the electrical receive signals to optical transmit signals, and transmit the optical transmit signals to optical transmit fibers of the plurality of optical fibers 36 that are mounted to the optical engine 188. The optical engine 188 is further configured to receive optical receive signals from optical receive fibers of the plurality of optical fibers 36 that are mounted to the optical engine 188, convert the optical receive signals to electrical transmit signals, and output the electrical signals to the electrical transmit traces of the transceiver substrate. The transceiver substrate 182 can define the mating portion 184a that is configured as described above with respect to the mating portion 142a of the electrical card 130. Thus, the contact pads 138 can include electrical transmit contact pads that transmit the electrical transmit signals to the electrical receive contacts of the board connector 26. The contact pads 138 can include electrical receive contact pads that receive the electrical receive signals from the electrical transmit contacts of the board connector 26. Optical transceivers are described in more detail in U.S. Pat. No. 9,374,165, the disclosure of which is hereby incorporated by reference as if set forth in its entirety herein.

Referring now to FIG. 6A, and as described above, the cable connector 22 can be configured as a hybrid connector 38 that is mounted to the cables 114 configured as optical cables or fibers 36 and electrical cables 32. As shown, the optical cable connector 34 includes the cable connector housing 128 as described above. Thus, the hybrid connector 38 further includes the mating interface 139 of the connector housing 128. As a result, the mating interface 139 of the hybrid connector 38 is substantially identical with respect to the mating interface of the optical cable connector 34 and the electrical connector 30 described above. Thus, the hybrid connector 38, the optical connector 34, and the electrical connector 30 can be interchangeably mated to the same board connector 26. Further, the hybrid connector 38 includes a hybrid card or substrate 190 that has a mounting portion 192b configured to be mounted to a plurality of optical fibers 36 and electrical cables 32, and a mating portion 192a that is configured to be received in the receptacle 50 of the board connector 26 between the first and second rows 44a and 44b in the manner described above, so as to mate the hybrid connector 38 to the board connector 26.

The hybrid substrate 190 can be configured as a card or a transceiver substrate as described above with respect to the optical cable connector 34, but can also include electrical traces having mounting pads configured to mount to respective ones of the electrical cables 32. The electrical cables 32 mounted to the hybrid substrate 190 can be configured as high speed twin axial cables 116 of the type described above or low speed coaxial cables 117 as desired. The hybrid connector can also include the optical transceiver 186 mounted to the hybrid substrate 190. Thus, the optical engine 188 of the hybrid connector 38 is configured to receive electrical receive signals from the board connector 26, convert the electrical receive signals to optical transmit signals, and transmit the optical transmit signals to optical transmit fibers of the plurality of optical fibers 36 that are mounted to the optical engine 188. The optical engine 188 is further configured to receive optical receive signals from optical receive fibers of the plurality of optical fibers 36 that are mounted to the optical engine 188, convert the optical receive signals to electrical transmit signals, and output the electrical signals to the electrical transmit traces of the transceiver substrate. The hybrid substrate 190 can define the mating portion 142a as described above with respect to the electrical card 130. Thus, the contact pads 138 can include electrical transmit contact pads that transmit the electrical transmit signals to the electrical receive contacts of the board connector 26. The contact pads 138 can include electrical receive contact pads that receive the electrical receive signals from the electrical transmit contacts of the board connector 26. The contact pads 138 can include electrical transmit contact pads that are in electrical communication with respective transmit cables of the electrical cables 32 that transmit signals to respective receive contacts of the board connector 26. The contact pads 138 can further include electrical receive contact pads that are in electrical communication with respective receive cables of the electrical cables 32 that receive signals from respective transmit contacts of the board connector 26.

Figure 6C:
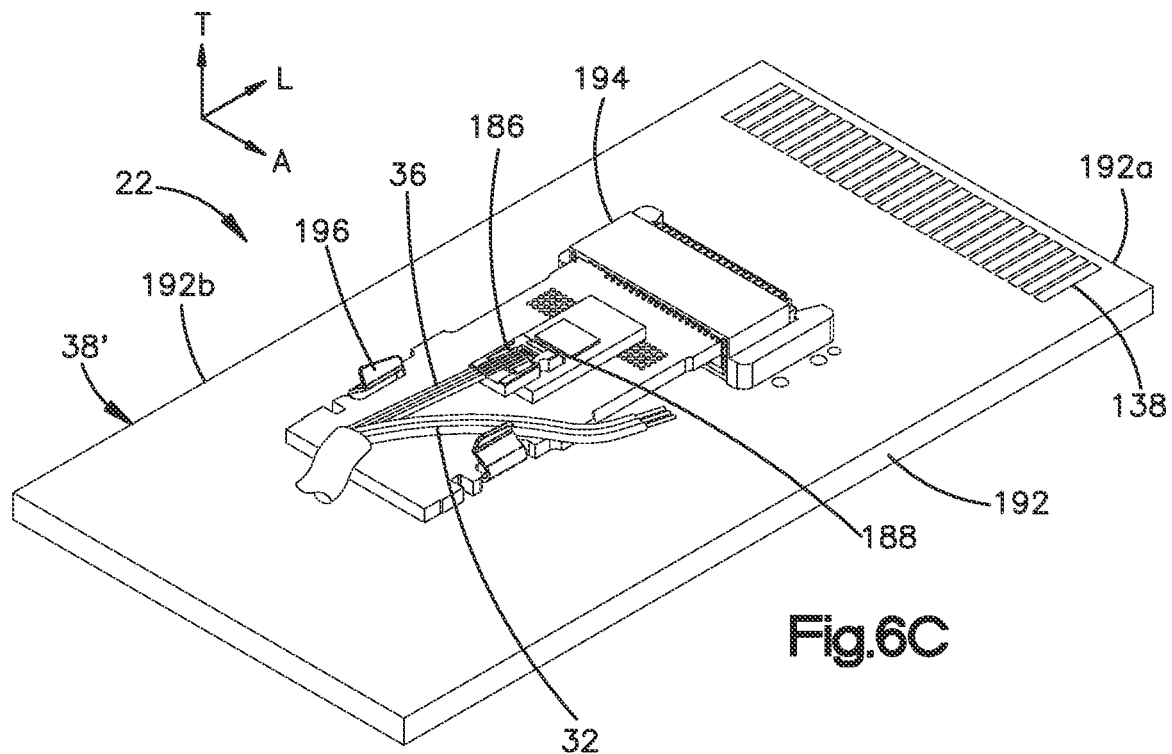
FIG. 6C is a perspective view of the hybrid cable connector of FIG. 6B.

Referring now to FIGS. 6B-6C, a second hybrid connector 38' can be constructed in accordance with an alternative embodiment than the first hybrid connector 38. The second hybrid connector 38' can include the transceiver substrate 182 as described above. While the transceiver substrate 82 can be directly mated to the board connector 26 as described above with respect to the optical cable connector 34, the transceiver substrate 182 can alternatively be indirectly placed in electrical communication with the board connector 26 through a host card or substrate 192 as shown in FIGS. 6B-6C that is also supported by the cable connector housing 128, and in particular by the housing body 129. The host substrate 192 can be configured as a printed circuit board, and can include the electrical contact pads 138 as described above with respect to the card 130. Thus, the host substrate 192 can be mated to the board connector 26 in the manner described above with respect to the card 130, the transceiver substrate 182, and the hybrid substrate 190.

The second hybrid connector 38' can include at least one electrical connector mounted to the host substrate 192, and the transceiver substrate 182 can be mated with the at least one electrical connector. In one example, the at least one electrical connector can include first and second electrical connectors 194 and 196. The first electrical connector 194 is spaced from the second electrical connector 196 in the forward direction. In one example, the first electrical connector 194 can be configured as an HSEC8 electrical connector commercially available by Samtec Inc., having a principal place of business in New Albany, IN Thus, the first electrical connector 194 can be constructed as described above with respect to the board connector 26. The second electrical connector 196 can be configured as a UCC8 electrical connector commercially available by Samtec Inc., having a principal place of business in New Albany, IN The first electrical connector 194 can be configured to transfer electrical signals at data transfer speeds greater than that of the second electrical connector 196 at a given level of worst-case multi-active asynchronous cross-talk. Thus, the first electrical connector 194 can be referred to as a high speed electrical connector configured to transmit electrical signals at the data transfer speeds described above per lane, while the second electrical connector 196 can be referred to as a low speed electrical connector. The host substrate 192 is described in more detail in U.S. Pat. No. 9,374,165, the disclosure of which is hereby incorporated by reference as if set forth in its entirety herein.

The mating portion of the transceiver substrate 182 can be inserted into the receptacle 50 of the first electrical connector 194, thereby placing the contact pads 138 of the transceiver substrate 182 in contact with respective ones of the electrical contacts 42 of the first electrical connector 194. The host substrate 192 can include mating pads at its bottom surface that are brought down onto electrical contacts 198 of the second electrical connector 196, which causes the electrical contacts 198 to compress toward the host substrate 192. Thus, the transceiver substrate 182 is placed in electrical communication with the first and second electrical connectors 194 and 196, and thus also the host substrate 192. High speed optical signals are transferred between respective ones of the optical cables and the first electrical connector 194, and low speed signals are transferred between respective ones of the optical cables and the second electrical connector 196.

The host substrate 192 can also include electrical traces having mounting pads configured to mount to respective ones of the electrical cables 32 as described above with respect to the hybrid substrate 90. Thus, respective ones of the electrical cables 32 can be placed in electrical communication with one or both of the first and second electrical connectors 194 and 196, and thus the with the host substrate 192. When the host substrate 32 is mated with the board connector 26 in the manner described above, the optical cables 36 are placed in electrical communication with respective ones of the electrical contacts 42 of the board connector 26 through the optical engine 188, transceiver substrate 182, the first and second electrical connectors 194 and 196, and the host substrate 192. The electrical cables 32 are placed in electrical communication with respective ones of the electrical contacts 42 of the board connector 26 through the host substrate 192, while bypassing the transceiver substrate 182.

It is appreciated that the electrical card 130, the optical card 182, the hybrid card 190, and the host card 192 can have the same number of electrical contacts on its respective top and bottom sides, arranged at the same pitch and location so as to be placed in electrical communication with respective ones of the electrical board contacts 42 of the board connector 26 in the manner described above. The contact pads at different positions of the cards 130, 182, 190, and 192 can be assigned as transmit contact pads, receive contact pads, and inactive contact pads as desired.

Referring now to FIGS. 1, 2A, and 3A, it is recognized that the mating interface 139 of any of the cable connectors 22 is sized, shaped, and configured to mate with any one of the board connector assemblies 24, thereby allowing the respective card to mate with the electrical contacts 42 of the board connector 26. However, it may be desirable to prevent the cable connectors 22 from mating with unintended ones of the board connector assemblies 24 other than the intended board connector assembly 24 to which the cable connector 22 is intended to mate. Therefore, in some examples, the cable connectors 22 can have keys 200 that are configured to create a mechanical interference with the unintended board connector assemblies 24 when attempting to mate the cable connectors 22 with any of the unintended board connector assemblies 24. The keys 200 are accepted by the intended board connector assembly 24. The keys 200 can be configured as projections 202 that extend out from the mating interface 139. For instance, the projections 202 can extend up from the top surface of the top wall 176. The board connector assemblies 24 can define a complementary recess 204 positioned to receive the projection 202 of the cable connector 22 to which the board connector assembly 24 is to be mated. For instance, the recess 204 can extend into the board connector housing 40. Both the projections 202 and the recesses 204 can be elongate along the longitudinal direction L. When the projections 202 and recesses 204 that are not aligned with each other, for instance offset along the lateral direction A, mechanical interference between the projection 202 and the board connector housing 40 will prevent the corresponding cable connector 22 from mating with the corresponding board connector 26. In one example, the projections 202 and recesses 204 can be disposed in one of eight positions, such that the cable connectors 22 are unable to mate with a majority of the unintended board connector assemblies 24.

Figure 7:
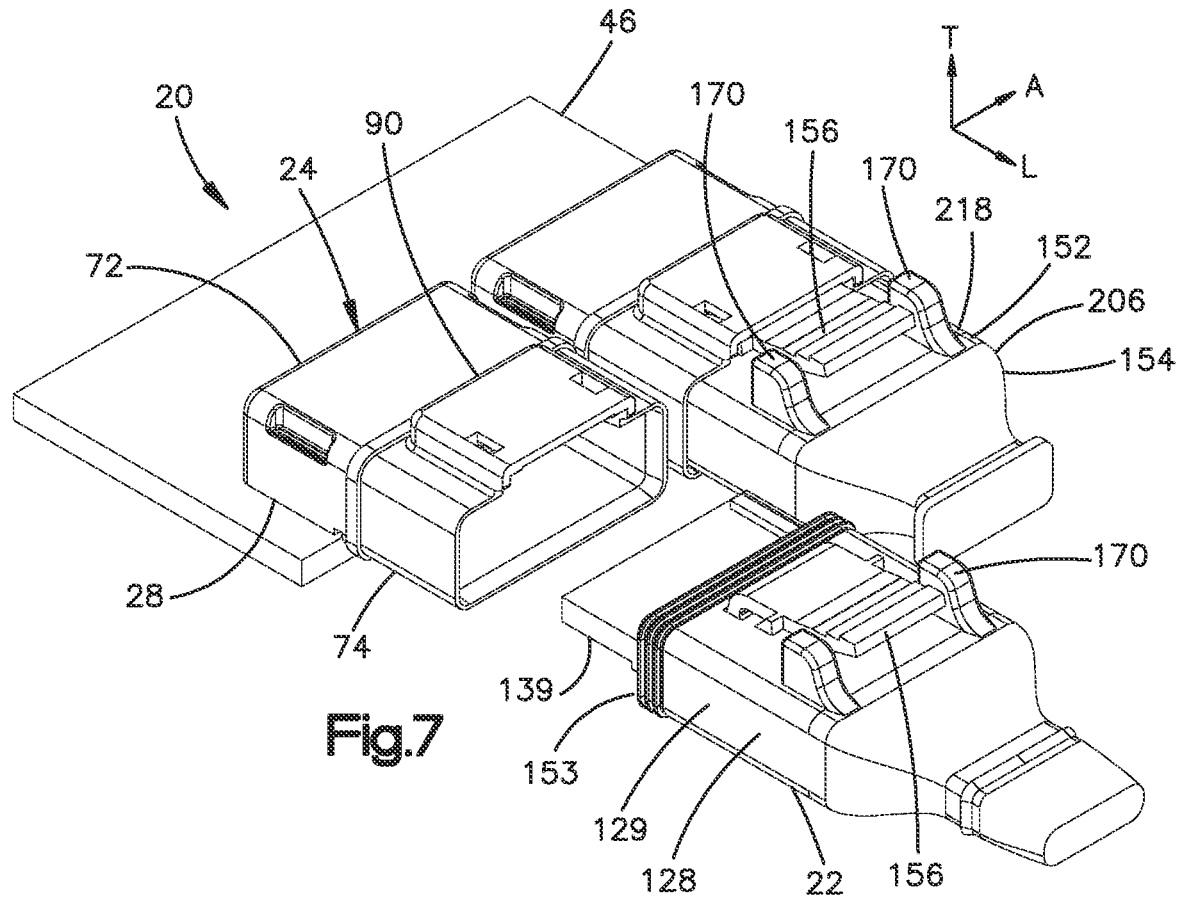
FIG. 7 shows an assigned board connector assembly being mated with a cable connector, and a plug inserted into an unassigned board connector assembly.

Referring now to FIG. 7, it is further recognized that in some configurations some unassigned board connectors 26 on the panel 68 are not intended to be mated with a corresponding cable connector 22. Therefore, instead of leaving the receptacles 50 of the unassigned board connectors 26 open to potential ingress of dust, liquid splash, and other debris during use, the data communication system 20 can include a plug 206 that is configured to be inserted into the cage 28 so as to seal the shroud channel 88 and prevent dust and liquid from entering the interface between the plug 206 and the cage 28. The plug 206 can include the cable connector housing 218, the guard 152, the shrink tube 154, the cable latch member 156, and the cable connector seal (not shown in FIG. 7), and the guard posts 170 as described above. Thus, the plug 206 includes the mating interface 139 (not shown in FIG. 7) as described above. The plug 206 can be devoid of a card, or can include a card devoid of electrical contacts to be inserted into the receptacle 50 of the board connector 26.

The user therefore can determine whether to mate the cable assembly 112 including the electrical cable connector 30, the optical cable connector 34, or the hybrid cable connector 38 to the at least one board connector assembly 24 or board connector assemblies 24 supported by the panel 68. It is recognized that electrical cable assemblies 112 having electrical cables 32 and electrical cable connectors 26 mounted to opposite ends of the electrical cables 32 can be the most cost effective, but can be subject to signal degradation when the electrical cable 32 extends over a long distance. It is recognized that optical cable assemblies having optical fibers 36 can be more expensive, but suffer from less signal degradation over longer lengths when compared to electrical cable assemblies 112 connectors 26. Further, optical cable assemblies can consume low power during operation, such as approximately 1 to 2 watts of power. It is further recognized that hybrid cable assemblies can include the benefits of the optical cable assembly for high speed data communication, and can include the cost benefits of the electrical cable assembly for communication of electrical signals not substantially affected by degradation over long lengths.

When it is desired for the cable 114 to carry signals at high data transfer speeds over a length that is no greater than a threshold length, the cable assembly 112 mated with the board connector assembly can be configured as the electrical cable assembly having electrical cables 32 and electrical cable connectors 30 mounted to opposite ends of the electrical cables, wherein one of the electrical cable connectors 30 is mated to the board connector 26, and the other of the electrical cables connectors is mated to a complementary electrical component. When it is desired for the cable 114 to carry signals at high data transfer speeds over a length that is greater than the threshold length, the cable assembly 112 mated with the board connector assembly can be configured as the optical cable assembly having the optical cables 36 and optical connectors 38 mounted to opposite ends of the optical cables, wherein one of the optical cable connectors 38 is mated with the board connector 26, and the other of the optical cable connectors 38 is mated with a complementary electrical component or optical component, collectively referred to as a data communication component. When it is also desired for the cable assembly 112 to carry electrical signals that are not subject to substantial degradation over the length that is greater than the threshold length, the cable assembly 112 can be configured as one of the first and second hybrid cable assemblies having cables 114 that include one or more electrical cables 32, optical cables 36, and the first or second hybrid connectors 38 or 38' described above mounted to opposite ends of the electrical cables 32 and optical cables. One of the hybrid connectors can be mated with the board connector 26, and the other of the hybrid connectors can be mated with a data communication component, which can include an electrical component or optical component.

In one example, the threshold can be in a range from approximately 1 meter up to approximately 10 meters, such as approximately 6 meters. For instance, the threshold can be approximately 1 meter, approximately 2 meters, approximately 3 meters, approximately 4 meters, approximately 5 meter, approximately 6 meters, approximately 7 meters, approximately 8 meters, approximately 9 meters, or approximately 10 meters, or any suitable alternative length as desired for a given application. The optical cable can extend any suitable length as desired, including up to approximately 30 meters, such as approximately 20 meters, such as approximately 15 meters, such as approximately 10 meters, such as approximately 6 meters, such as approximately 4 meters, such as approximately 2 meters.

Thus, a method is provided for selectively mating one or more select board connector assemblies 24 with different respective cable connectors of a kit of cable connectors 22 that are all intermateable with the board connector assemblies. Thus, each of the cable connectors 22 of the kit of cable connectors 22 can be intermateable with a common electrical connector that can be configured as the board connector 26 or any suitable alternative electrical connector. The kit of cable connectors can include the electrical cable connector 30, the optical cable connector 34, or at least one hybrid cable connector such as the first hybrid cable connector 38 and the second hybrid cable connector 38'. The select board connector assemblies and the respective cable connectors can be keyed to ensure proper mating in the manner described above. Thus, a plurality of board connector assemblies 24 can be mated with different ones of the electrical cable connector 30, the optical cable connector 34, and at least one hybrid cable connector such as the first hybrid cable connector 38 and the second hybrid cable connector 38' of the kit.

A method is further provided for selectively mating one or more board connector assemblies 24 with different respective cable connector assemblies of a kit of cable assemblies 112. The kit of cable assemblies can include two or more up to all of the electrical cable connector assembly, the optical cable connector assembly, and at least one or both of the hybrid cable connector assemblies. Thus, a plurality of board connector assemblies 24 can be mated with different ones of the cable assemblies of the kit of cable assemblies in the manner described above. Otherwise stated, the cable assemblies of the kit of cable assemblies are each selectively intermateable with a common electrical connector that can be configured as the board connector 26 described above or any suitable alternative electrical connector.

It should be appreciated that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

The invention claimed is:

1. A kit of cable connectors each having mating interfaces that are selectively intermateable with a mating interface of a common electrical connector, the kit comprising:
   an electrical cable connector having a respective electrically insulative cable connector housing, a respective substrate supported by the cable connector housing, and a plurality of electrically conductive cables mounted to the substrate, wherein the substrate includes electrical contact pads that are configured to mate with the common electrical connector; and
   an optical cable connector having a respective cable connector housing, a transceiver substrate supported by the cable connector housing of the optical cable connector, an optical engine mounted to transceiver substrate, and a plurality of optical fibers mounted to the optical engine, wherein the transceiver substrate includes electrical contact pads that are configured to mate with the common electrical connector, and the optical cable connector includes no electrical cables.

2. The kit of claim 1, wherein the electrical cable connector includes no optical cables.

3. The kit of claim 1, further comprising:
   a first hybrid cable connector having a respective electrically insulative cable connector housing, a transceiver substrate supported by the cable connector housing of the optical cable connector, an optical engine mounted to transceiver substrate, and a plurality of optical fibers mounted to the optical engine, and a plurality of electrical cables mounted to the transceiver substrate,
   wherein the transceiver substrate of the first hybrid cable connector includes respective electrical contact pads that are configured to mate with the common electrical connector.

4. The kit of claim 3, further comprising:
   a second hybrid cable connector having a respective electrically insulative cable connector housing, a transceiver substrate supported by the cable connector housing of the optical cable connector, an optical engine mounted to transceiver substrate, and a plurality of optical fibers mounted to the optical engine;
   a host substrate and at least one electrical connector mounted to the host substrate, wherein the transceiver substrate is mated with the at least one electrical connector;
   and at least one electrical cable mounted to the host substrate,
   wherein the host substrate includes respective electrical contact pads that are configured to mate with the common electrical connector.

5. The kit of claim 4, wherein each of the electrical cable connector, the optical cable connector, the first hybrid cable connector, and the second hybrid cable connector are each configured to individually and selectively mate with the common electrical connector so as to define a data communication system that is compliant with multiple performance standards.

6. The kit of claim 5, wherein the multiple performance standards comprises compliance with USCAR-2.

7. The kit of claim 5, wherein the multiple performance standards comprises USCAR-2, 5.4.6.

8. The kit of claim 5, wherein the data communication system is configured to transmit signals at data speeds up to 25 gigabits/second with no more than 6% worst-case asynchronous multi-active crosstalk.

9. The kit of claim 1, wherein the electrical contact pads are arranged along at least one row on a center-to-center contact pitch of approximately 0.8 mm.

10. The kit of claim 9, wherein each row includes twenty contact pads.

11. The kit of claim 1, wherein the mating interface of each of the cable connectors is configured to be received in a void that extends between the common electrical connector and a cage that at least partially surrounds the common electrical connector.

12. The kit of claim 1, wherein each of the cable connectors includes a cable latch member that is supported by the cable connector housing, and includes a resilient deflectable latch arm and at least one projection that extends from the latch arm.

13. The kit of claim 12, wherein the at least one projection does not extend beyond top and bottom surfaces of the latch arm.

14. The kit of claim 12, wherein the at least one projection has a beveled front surface.

15. The kit of claim 12, wherein the projection is suspended over a top surface of the cable connector housing.

16. The kit of claim 12, wherein the latch arm is configured to be depressed toward the cable connector housing from an engagement position to a disengagement position.

17. The kit of claim 16, wherein the latch arm is naturally resiliently biased from the disengagement position to the engagement position.

18. The kit of claim 12, wherein each of the cable connectors comprises at least one post that extends to a location above the latch arm.

19. The kit of claim 18, further comprising a pair of posts, wherein the latch arm is disposed between latch posts.

20. The kit of claim 1, wherein each of the cable connectors comprises a compressible seal that surrounds the housing of the cable connector, wherein the seal is configured to compress against an inner surface of the common electrical connector when the cable connector is mated to the common electrical connector.

21. A data communication system comprising:
the kit of claim 1; and
the common electrical connector.

22. The data communication system of claim 21, comprising an electrical board connector assembly that comprises:
an electrical board connector that defines the common electrical connector, the electrical board connector configured to be mounted to a respective substrate, the electrical board connector including:
a respective electrically insulative connector housing; and
a respective plurality of electrical contacts supported by the respective electrically insulative connector housing; and
a cage configured to be mounted to the substrate such that the cage at least partially surrounds the electrical board connector.

23. The data communication system of claim 22, wherein the electrical board connector comprises a board latch member that is configured to engage a cable connector latch member of the cable connector mated with the electrical board connector so as to releasably secure the mated cable connector to the board connector when the cable connector is mated to the board connector so as to define a data communication assembly that complies with mechanical shock and vibration standards of USCAR-2, 5.4.6.

24. The data communication system of claim 22, wherein the cage of the electrical board connector assembly is mounted to a panel so as to extend through an opening of the panel.

25. The data communication system of claim 24, comprising a first plurality of electrical board connector assemblies mounted onto a first side of a substrate, and a second plurality of electrical board connector assemblies mounted onto a second side of the substrate opposite the first side.

26. The kit of claim 1, wherein the respective cable connector housing of the optical cable connector is electrically insulative.

* * * * *